US012609109B2

(12) United States Patent
Wang et al.

(10) Patent No.: US 12,609,109 B2
(45) Date of Patent: Apr. 21, 2026

(54) SPEECH RECOGNITION METHOD AND APPARATUS, AND COMPUTER-READABLE STORAGE MEDIUM

(71) Applicant: Tencent Technology (Shenzhen) Company Limited, Shenzhen (CN)

(72) Inventors: Jun Wang, Shenzhen (CN); Wing Yip Lam, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 767 days.

(21) Appl. No.: 17/583,512

(22) Filed: Jan. 25, 2022

(65) Prior Publication Data

US 2022/0148571 A1 May 12, 2022

Related U.S. Application Data

(63) Continuation of application No. PCT/CN2020/128392, filed on Nov. 12, 2020.

(30) Foreign Application Priority Data

Jan. 16, 2020 (CN) .......................... 202010048780.2

(51) Int. Cl.
*G10L 15/06* (2013.01)
*G10L 15/02* (2006.01)
(Continued)

(52) U.S. Cl.
CPC ............ *G10L 15/063* (2013.01); *G10L 15/02* (2013.01); *G10L 15/16* (2013.01); *G10L 15/22* (2013.01);
(Continued)

(58) Field of Classification Search
CPC ......... G10L 15/00; G10L 15/02; G10L 15/16; G10L 15/22; G10L 15/063;
(Continued)

(56) References Cited

U.S. PATENT DOCUMENTS 10,147,442 B1 12/2018 Panchapagesan et al.
2018/0053087 A1* 2/2018 Fukuda .................. G06N 3/045
(Continued)

FOREIGN PATENT DOCUMENTS

CN 109378010 A 2/2019
CN 109637526 A 4/2019
(Continued)

OTHER PUBLICATIONS

Lam, M. W., Wang, J., Liu, X., Meng, H., Su, D., & Yu, D. (2019). Extract, Adapt and Recognize: An End-to-End Neural Network for Corrupted Monaural Speech Recognition. In Interspeech (pp. 2778-2782). (Year: 2019).*
(Continued)

*Primary Examiner* — Sean E Serraguard
(74) *Attorney, Agent, or Firm* — Crowell & Moring LLP

(57) ABSTRACT

This application relates to a speech recognition method and apparatus, and a computer-readable storage medium, and the method includes: obtaining a first loss function of a speech separation and enhancement model and a second loss function of a speech recognition model; performing back propagation based on the second loss function to train an intermediate model bridged between the speech separation and enhancement model and the speech recognition model, to obtain a representation model; fusing the first loss function and the second loss function, to obtain a target loss function; and jointly training the speech separation and enhancement model, the representation model, and the speech recognition model based on the target loss function, and ending the training when a preset convergence condition is met.

20 Claims, 9 Drawing Sheets

(51) Int. Cl.

| | | |
|---|---|---|
| *G10L 15/16* | (2006.01) | |
| *G10L 15/22* | (2006.01) | |
| *G10L 21/0272* | (2013.01) | |
| *G10L 25/18* | (2013.01) | |

(52) U.S. Cl.
CPC .......... *G10L 21/0272* (2013.01); *G10L 25/18* (2013.01); *G10L 2015/025* (2013.01)

(58) Field of Classification Search
CPC ............... G10L 2015/025; G10L 21/00; G10L 21/0272; G10L 25/00; G10L 25/18
See application file for complete search history.

(56) References Cited

U.S. PATENT DOCUMENTS

| | | | |
|---|---|---|---|
| 2018/0350351 A1 * | 12/2018 | Kopys .................... | G06N 3/044 |
| 2019/0043516 A1 | 2/2019 | Germain et al. | |
| 2019/0228776 A1 | 7/2019 | Yamashita | |
| 2020/0335091 A1 * | 10/2020 | Chang ..................... | G10L 15/14 |
| 2021/0158799 A1 * | 5/2021 | Zhang .................... | G10L 15/02 |

FOREIGN PATENT DOCUMENTS

| | | | | |
|---|---|---|---|---|
| CN | 110060660 A | | 7/2019 | |
| CN | 110070855 A | | 7/2019 | |
| CN | 110120227 A | | 8/2019 | |
| CN | 110517666 A | | 11/2019 | |
| CN | 110570845 A | | 12/2019 | |
| CN | 110600017 A | * 12/2019 | .......... | G10L 15/144 |
| CN | 110648659 A | | 1/2020 | |
| CN | 111261146 A | | 6/2020 | |
| JP | 2019-078857 A | | 5/2019 | |
| WO | WO 2019/198265 A | | 10/2019 | |

OTHER PUBLICATIONS

Chen, Z., Droppo, J., Li, J. and Xiong, W., 2017. Progressive joint modeling in unsupervised single-channel overlapped speech recognition. IEEE/ACM Transactions on Audio, Speech, and Language Processing, 26(1), pp. 184-196. (Year: 2017).*

Zhang, X. and Wang, H., Jul. 2016. A joint model of intent determination and slot filling for spoken language understanding. In IJCAI (vol. 16, No. 2016, pp. 2993-2999) (Year: 2016).*

Z. Chen, Y. Luo and N. Mesgarani, "Deep attractor network for single-microphone speaker separation," 2017 IEEE International Conference on Acoustics, Speech and Signal Processing (ICASSP), New Orleans, LA, USA, 2017, pp. 246-250, doi: 10.1109/ICASSP.2017.7952155 (Year: 2017).*

Schmidt, M.N. and Olsson, R.K., Sep. 2006. Single-channel speech separation using sparse non-negative matrix factorization. In Interspeech (vol. 2, pp. 2-5). (Year: 2006).*

International Search Report and Written Opinion mailed Feb. 9, 2021 for International Application No. PCT/CN2020/128392.

Search Report and Office Action issued on Chinese application No. 202010048780.2 on May 23, 2022, 6 pages, in Chinese language.

Extended European Search Report issued on European application No. 20913796.7 on Oct. 11, 2022, 10 pages.

Notice of Reasons for Refusal issued on Japanese application 2022-520112 on Dec. 23, 2022, 3p, in Japanese language.

Lam, Max W.Y. et al., "Extract, Adapt and Recognize: an End-to-end Neural Network for Corrupted Monaural Speech Recognition", Interspeech 2019, ISCA, Sep. 19, 2019, pp. 2778-2782, Graz, AT.

Wang, Zhong-Qiu et al., "A Joint Training Framework for Robust Automatic Speech Recognition", IEEE/Transactions on Audio, Speech, Language Processing, vol. 24, No. 4, Apr. 2016, pp. 796-806.

Li, Chenda et al., "ESPNET-SE: End-to-End Speech Enhancement and Separation Toolkit Designed for ASR Integration", arxiv.org, Cornell University Library, Cornell University, Nov. 7, 2020, 8p, Ithaca, NY.

* cited by examiner

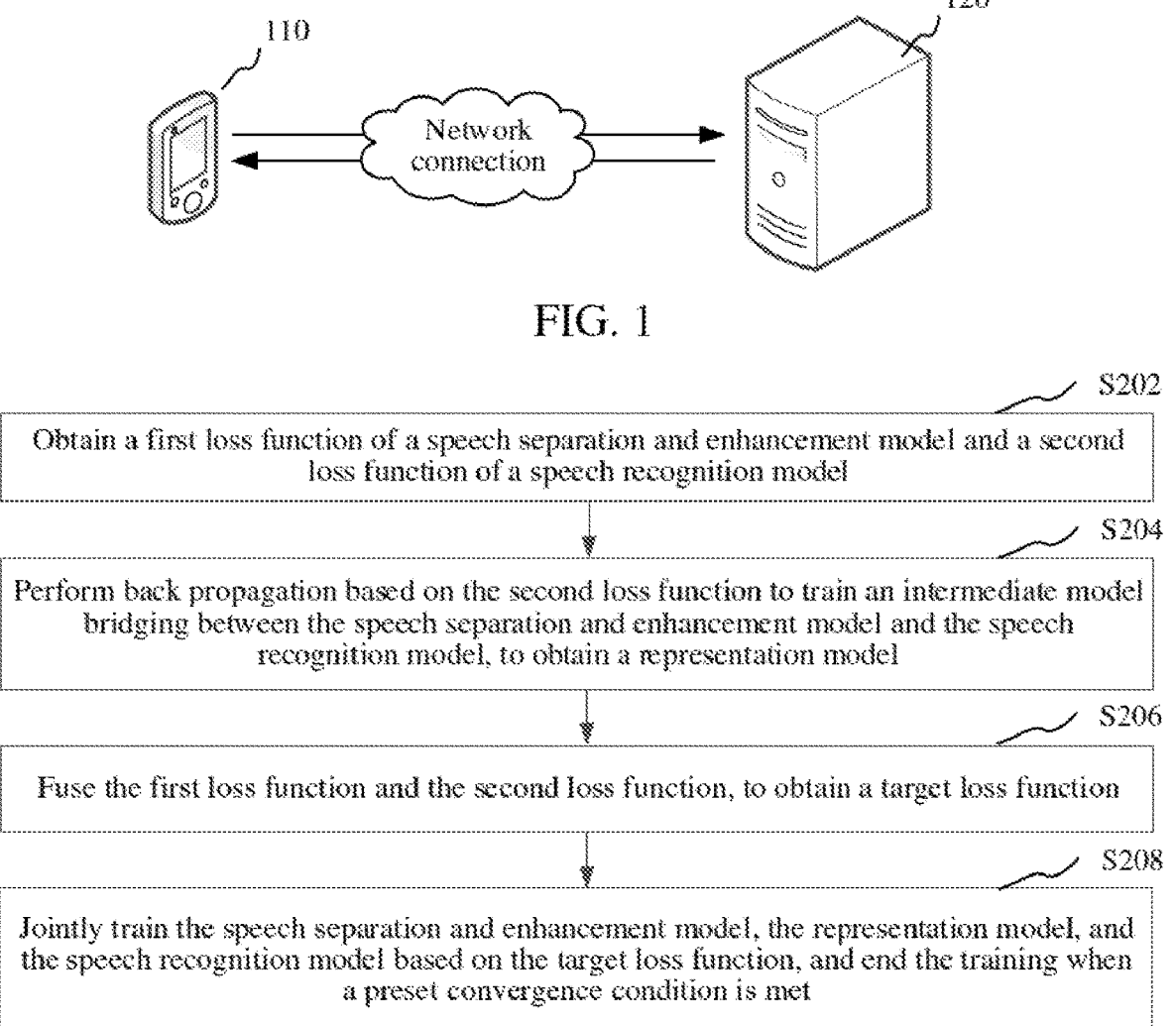

Obtain a first loss function of a speech separation and enhancement model and a second loss function of a speech recognition model

S204

Perform back propagation based on the second loss function to train an intermediate model bridging between the speech separation and enhancement model and the speech recognition model, to obtain a representation model

S206

Fuse the first loss function and the second loss function, to obtain a target loss function

S208

Jointly train the speech separation and enhancement model, the representation model, and the speech recognition model based on the target loss function, and end the training when a preset convergence condition is met

FIG. 2

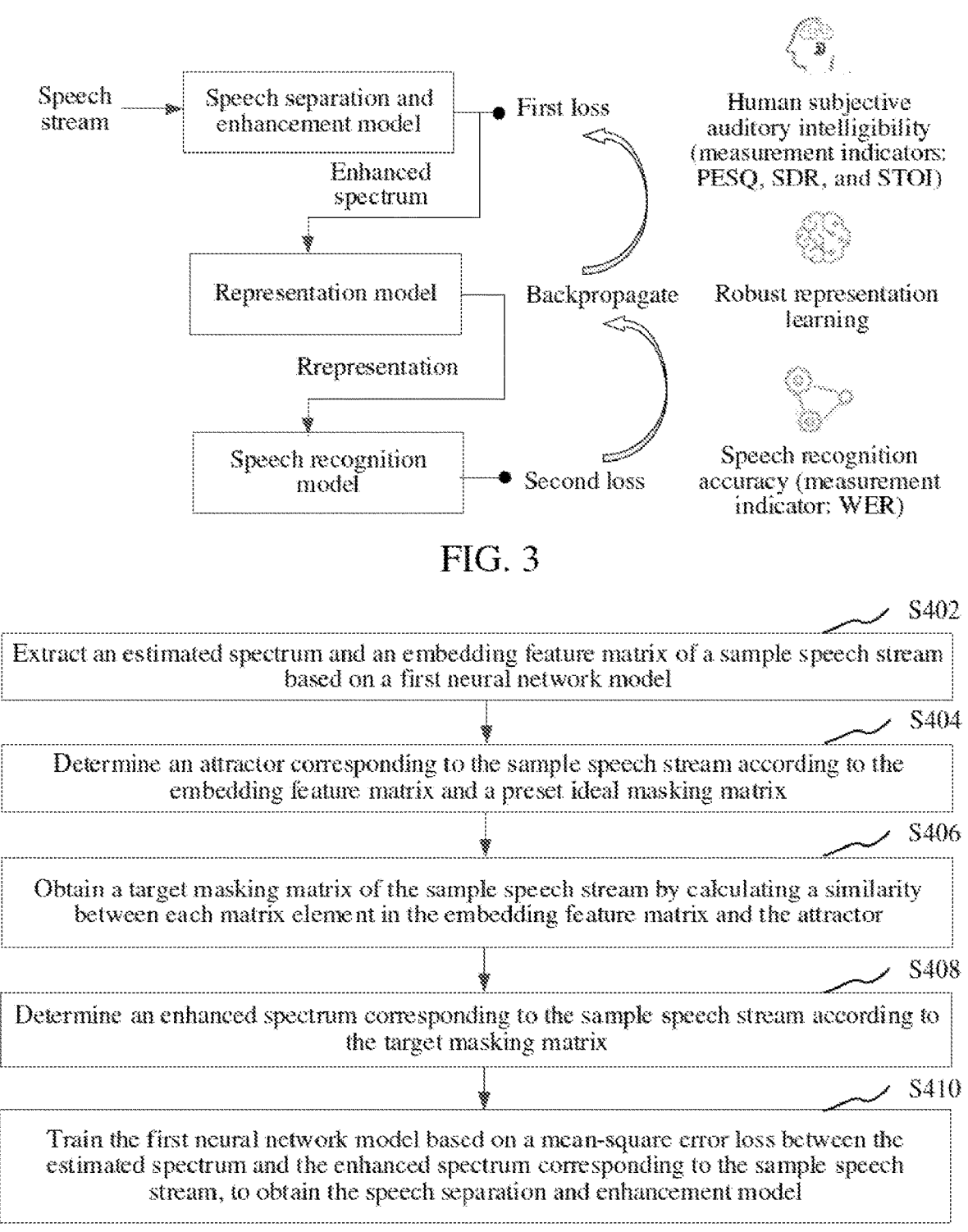

Extract an estimated spectrum and an embedding feature matrix of a sample speech stream based on a first neural network model

S404

Determine an attractor corresponding to the sample speech stream according to the embedding feature matrix and a preset ideal masking matrix

S406

Obtain a target masking matrix of the sample speech stream by calculating a similarity between each matrix element in the embedding feature matrix and the attractor

S408

Determine an enhanced spectrum corresponding to the sample speech stream according to the target masking matrix

S410

Train the first neural network model based on a mean-square error loss between the estimated spectrum and the enhanced spectrum corresponding to the sample speech stream, to obtain the speech separation and enhancement model

FIG. 4

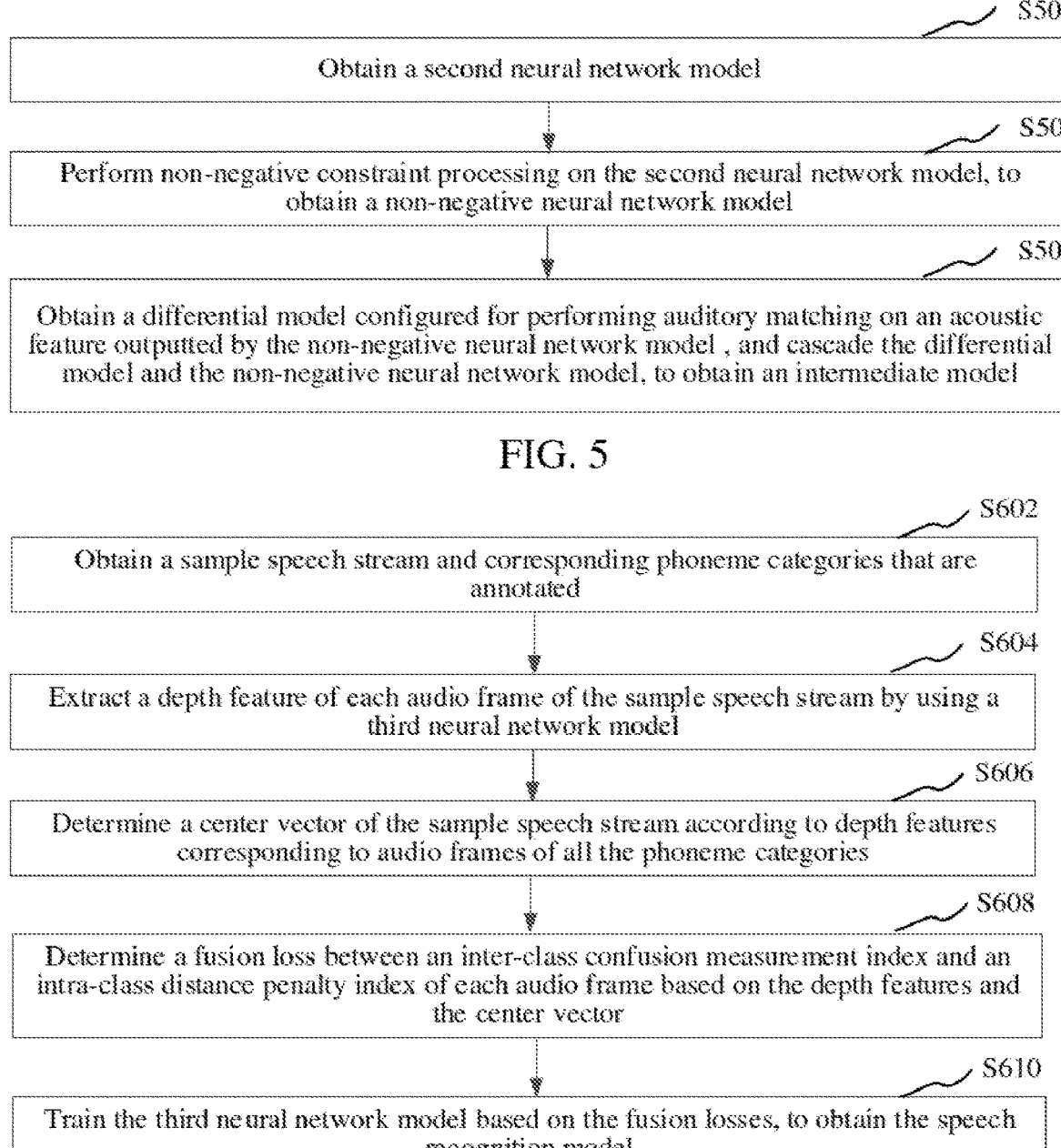

S502

Obtain a second neural network model

S504

Perform non-negative constraint processing on the second neural network model, to obtain a non-negative neural network model

S506

Obtain a differential model configured for performing auditory matching on an acoustic feature outputted by the non-negative neural network model , and cascade the differential model and the non-negative neural network model, to obtain an intermediate model

Obtain a sample speech stream and corresponding phoneme categories that are annotated

S604

Extract a depth feature of each audio frame of the sample speech stream by using a third neural network model

S606

Determine a center vector of the sample speech stream according to depth features corresponding to audio frames of all the phoneme categories

S608

Determine a fusion loss between an inter-class confusion measurement index and an intra-class distance penalty index of each audio frame based on the depth features and the center vector

S610

Train the third neural network model based on the fusion losses, to obtain the speech recognition model

FIG. 6

S702

Perform Fourier transform on the sample speech stream, to obtain a speech spectrum and a speech feature of each audio frame

S704

Perform speech separation and speech enhancement on the speech spectrum based on the first neural network model, to obtain the estimated spectrum

S706

Map the speech feature to an embedding space based on the first neural network model, to obtain an embedding feature matrix

S708

Determine an ideal masking matrix according to the speech spectrum and the speech feature

S710

Filter out noise elements in the ideal masking matrix based on a preset binary threshold matrix

S712

Determine the attractor corresponding to the sample speech stream according to the embedding feature matrix and the ideal masking matrix from which the noise elements have been filtered out

S714

Obtain a target masking matrix of the sample speech stream by calculating a similarity between each matrix element in the embedding feature matrix and the attractor

S716

Determine an enhanced spectrum corresponding to the sample speech stream according to the target masking matrix

S718

Calculate an MSE loss between the estimated spectrum and the enhanced spectrum corresponding to the sample speech stream based on the first loss function

S720

Train the first neural network model based on the MSE loss, to obtain the speech separation and enhancement model

S722

Obtain a sample speech stream and corresponding phoneme categories that are annotated

S724

Extract a depth feature of each audio frame of the sample speech stream by using a third neural network model

S726

Determine a center vector of the sample speech stream according to depth features corresponding to the audio frames of all the phoneme categories

S728

Input the depth features into a cross entropy function and calculate the inter-class confusion measurement index of each audio frame

S730

Input the depth features and the center vector into a center loss function and calculate the intra-class distance penalty index of each audio frame

S732

Perform a fusion operation on the inter-class confusion measurement index and the intra-class distance penalty index, to obtain a fusion loss based on the second loss function

S734

Train the third neural network model based on the fusion losses, to obtain the speech recognition model

S736

Obtain a first loss function of a speech separation and enhancement model and a second loss function of a speech recognition model

S738

Obtain a second neural network model

S740

Perform non-negative constraint processing on the second neural network model, to obtain a non-negative neural network model

S742

Obtain a differential model configured for performing auditory matching on an acoustic feature outputted by the non-negative neural network model

S744

Cascade the differential model and non-negative neural network model to obtain the intermediate model

S746

Perform back propagation based on the second loss function to train an intermediate model bridging the speech separation/enhancement and the speech recognition models to obtain a representation model

S748

Fuse the first loss function and the second loss function, to obtain a target loss function

S750

Determine a global descent gradient generated by the target loss function

S752

Iteratively update model parameters corresponding to the speech separation/enhancement, the representation, and the speech recognition models according to the global descent gradient, until a minimum loss value of the target loss function is obtained

FIG. 7

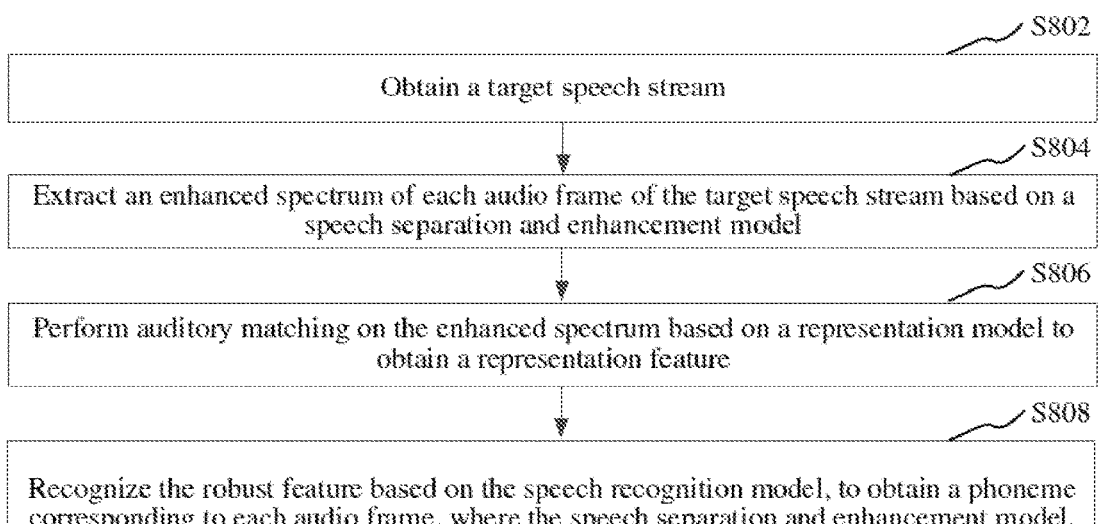

| Obtain a target speech stream | S802 |

| Extract an enhanced spectrum of each audio frame of the target speech stream based on a speech separation and enhancement model | S804 |

| Perform auditory matching on the enhanced spectrum based on a representation model to obtain a representation feature | S806 |

| Recognize the robust feature based on the speech recognition model, to obtain a phoneme corresponding to each audio frame, where the speech separation and enhancement model, the representation model, and the speech recognition model are obtained by joint training | S808 |

FIG. 8

| Speech recognition method | SNR when interfered by background music | | | | | SNR when interfered by other speakers | | | | |
|---|---|---|---|---|---|---|---|---|---|---|
| | 0dB | 5dB | 10dB | 15dB | 20dB | 0dB | 5dB | 10dB | 15dB | 20dB |
| ASR (clean speech) | 92.9 | 85.2 | 72.2 | 56.3 | 42.0 | 99.5 | 87.7 | 69.8 | 51.0 | 36.7 |
| ASR (interference speech) | 60.0 | 40.7 | 30.4 | 24.2 | 20.3 | 82.2 | 57.7 | 33.8 | 22.7 | 18.8 |
| SS + ASR cascade | 56.3 | 44.8 | 36.9 | 32.0 | 29.0 | 86.4 | 61.4 | 40.6 | 32.1 | 28.4 |
| EAR ($\lambda_{SS}=0$) | 43.0 | 33.8 | 28.5 | 23.3 | 19.9 | 75.4 | 48.2 | 24.6 | 14.1 | 12.0 |
| EAR ($\lambda_{SS}=0.1$) | 25.7 | 18.3 | 14.7 | 13.0 | 12.2 | 63.6 | 39.9 | 18.8 | 11.7 | 10.9 |

FIG. 9a

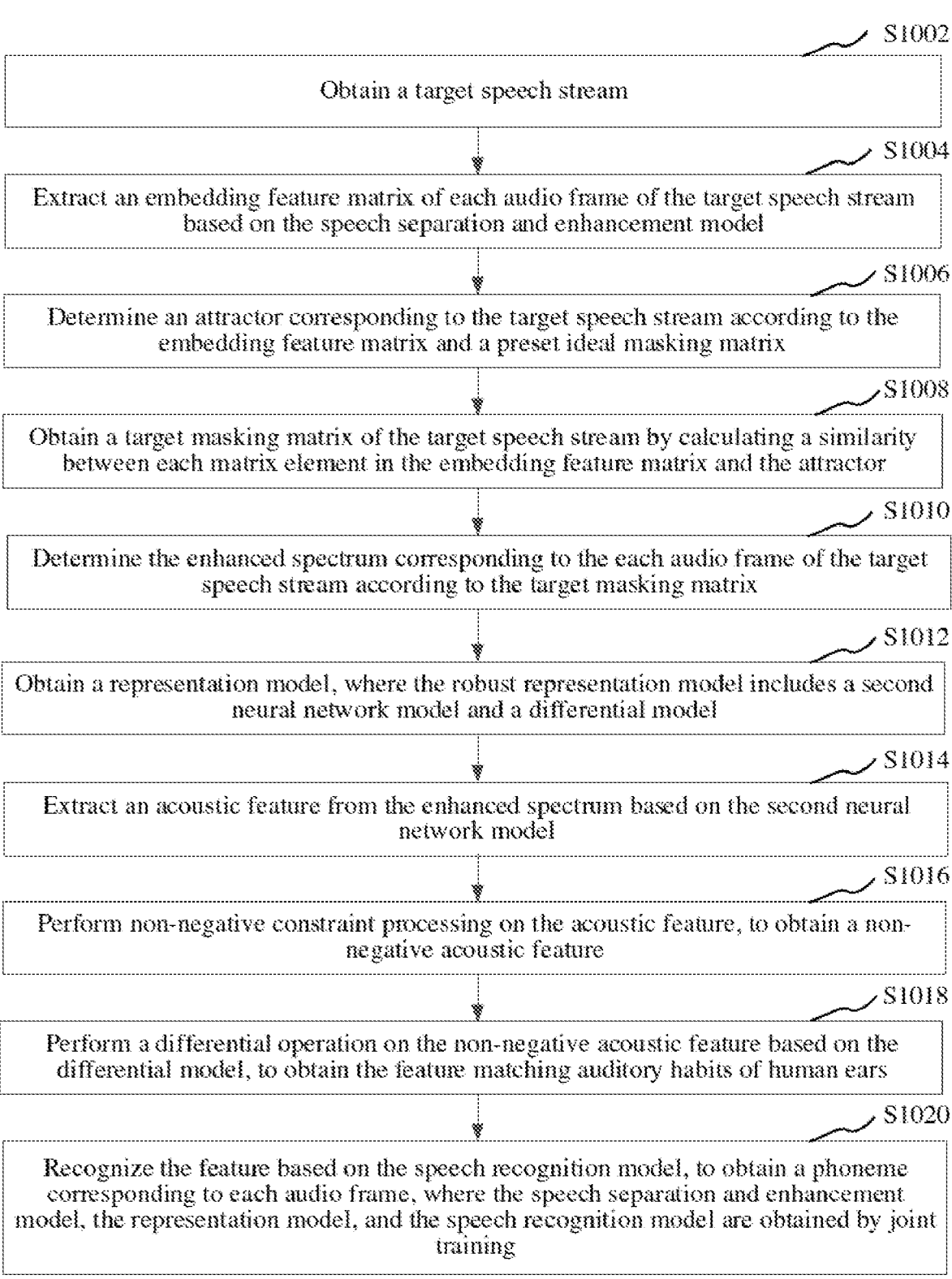

S1002

Obtain a target speech stream

S1004

Extract an embedding feature matrix of each audio frame of the target speech stream based on the speech separation and enhancement model

S1006

Determine an attractor corresponding to the target speech stream according to the embedding feature matrix and a preset ideal masking matrix

S1008

Obtain a target masking matrix of the target speech stream by calculating a similarity between each matrix element in the embedding feature matrix and the attractor

S1010

Determine the enhanced spectrum corresponding to the each audio frame of the target speech stream according to the target masking matrix

S1012

Obtain a representation model, where the robust representation model includes a second neural network model and a differential model

S1014

Extract an acoustic feature from the enhanced spectrum based on the second neural network model

S1016

Perform non-negative constraint processing on the acoustic feature, to obtain a non-negative acoustic feature

S1018

Perform a differential operation on the non-negative acoustic feature based on the differential model, to obtain the feature matching auditory habits of human ears

S1020

Recognize the feature based on the speech recognition model, to obtain a phoneme corresponding to each audio frame, where the speech separation and enhancement model, the representation model, and the speech recognition model are obtained by joint training

FIG. 10

SPEECH RECOGNITION METHOD AND APPARATUS, AND COMPUTER-READABLE STORAGE MEDIUM

RELATED APPLICATION

This application is a continuation of and claims priority to PCT International Application No. PCT/CN2020/128392, entitled "SPEECH RECOGNITION METHOD AND MODEL TRAINING METHOD, APPARATUS, AND COMPUTER-READABLE STORAGE MEDIUM" and filed on Nov. 12, 2020, which claims priority to Chinese Patent Application No. 202010048780.2, entitled "SPEECH RECOGNITION METHOD AND MODEL TRAINING METHOD, APPARATUS, AND COMPUTER-READABLE STORAGE MEDIUM" and filed on Jan. 16, 2020. Both of these applications are incorporated by reference in their entireties.

FIELD OF THE TECHNOLOGY

This application relates to the field of speech processing technologies, and in particular, to a speech recognition method and apparatus, and a computer-readable storage medium.

BACKGROUND OF THE DISCLOSURE

The development of speech recognition technologies makes it possible for humans to interact with machines by using natural language. A speech signal may be converted into a text sequence based on the speech recognition technologies. To realize such conversion, front-end processing such as speech separation (SS) and speech enhancement (SE) may be performed on a received speech signal, and then back-end processing such as automatic speech recognition (ASR) may be performed on an acoustic feature obtained through the front-end processing.

In conventional technologies, speech separation and speech enhancement are performed on the speech signal by using a speech separation and enhancement model, and then speech recognition is performed by using a speech recognition model. However, such a method usually offers low accuracy in speech recognition.

SUMMARY

Embodiments of this application provide a speech recognition method and apparatus, and a computer-readable storage medium.

A speech recognition method, performed by a computer device, the method including: obtaining a first loss function of a speech separation and enhancement model and a second loss function of a speech recognition model; performing back propagation based on the second loss function to train an intermediate model bridged between the speech separation and enhancement model and the speech recognition model, to obtain a robust (or robustness) representation model; fusing the first loss function and the second loss function, to obtain a target loss function; jointly training the speech separation and enhancement model, the robust representation model, and the speech recognition model based on the target loss function, and ending the joint training when a preset convergence condition is met.

A speech recognition apparatus, including: an intermediate representation learning module, configured to obtain a first loss function of a speech separation and enhancement model and a second loss function of a speech recognition model; and perform back propagation based on the second loss function to train an intermediate model bridging between the speech separation and enhancement model and the speech recognition model, to obtain a robust representation model; a loss fusion module, configured to fuse the first loss function and the second loss function, to obtain a target loss function; and a joint training module, configured to jointly train the speech separation and enhancement model, the robust representation model, and the speech recognition model based on the target loss function, and ending the training when a preset convergence condition is met.

A speech recognition method, performed by a computer device, the method including: obtaining a target speech stream; extracting an enhanced spectrum of each audio frame of the target speech stream based on a speech separation and enhancement model; performing auditory matching on the enhanced spectrum based on a robustness representation model to obtain a robustness or representation feature; and recognizing the robustness or representation feature based on a speech recognition model, to obtain a phoneme corresponding to each audio frame. The speech separation and enhancement model, the robustness representation model, and the speech recognition model being obtained by joint training.

A speech recognition apparatus, including: a speech separation and enhancement module, configured to obtain a target speech stream; and extract an enhanced spectrum of each audio frame of the target speech stream based on a speech separation and enhancement model; an intermediate representation transition module, configured to perform auditory matching on the enhanced spectrum based on a robustness representation model to obtain a robustness feature; and a speech recognition module, configured to recognize the robustness feature based on a speech recognition model, to obtain a phoneme corresponding to each audio frame, the speech separation and enhancement model, the robust representation model, and the speech recognition model being obtained by joint training.

One or more non-volatile storage media storing computer-readable instructions are provided, the computer-readable instructions, when executed by one or more processors, causing the one or more processors to perform the operations of the foregoing speech recognition method.

A computer device including a memory and a processor is provided, the memory storing computer-readable instructions, the computer-readable instructions, when executed by the processor, causing the processor to perform the operations of the foregoing speech recognition method.

Details of one or more embodiments of this application are provided in the accompanying drawings and descriptions below. Other features, objectives, and advantages of this application become apparent with reference to the specification, accompanying drawings, and claims.

BRIEF DESCRIPTION OF THE DRAWINGS

To describe technical solutions in embodiments of this application more clearly, the following briefly introduces accompanying drawings for describing the embodiments. The accompanying drawings in the following description show merely some example embodiments of this application, and a person of ordinary skill in the art may derive other accompanying drawings according to the accompanying drawings without creative efforts.

FIG. 1 is a diagram of an example application environment of a speech recognition method according to an embodiment.

FIG. 2 is a schematic flowchart of an example speech recognition method according to an embodiment.

FIG. 3 is a schematic diagram of an example model architecture for bridging a speech separation and enhancement model and a speech recognition model based on a robust representation model according to an embodiment.

FIG. 4 is an example schematic flowchart for pre-training a speech processing model according to an embodiment.

FIG. 5 is an example schematic flowchart for constructing an intermediate model according to an embodiment.

FIG. 6 is an example schematic flowchart for pre-training a speech recognition model according to an embodiment.

FIG. 7 is a schematic flowchart of an example speech recognition method according to a specific embodiment.

FIG. 8 is a schematic flowchart of an example speech recognition method according to an embodiment.

FIG. 9a is an example schematic diagram for comparing word error rates of recognizing speech from two acoustic environments under five signal-to-noise ratio (SNR) conditions based on different speech recognition methods according to an embodiment.

FIG. 10 is a schematic flowchart of an example speech recognition method according to a specific embodiment.

DESCRIPTION OF EMBODIMENTS

Figure 9B:
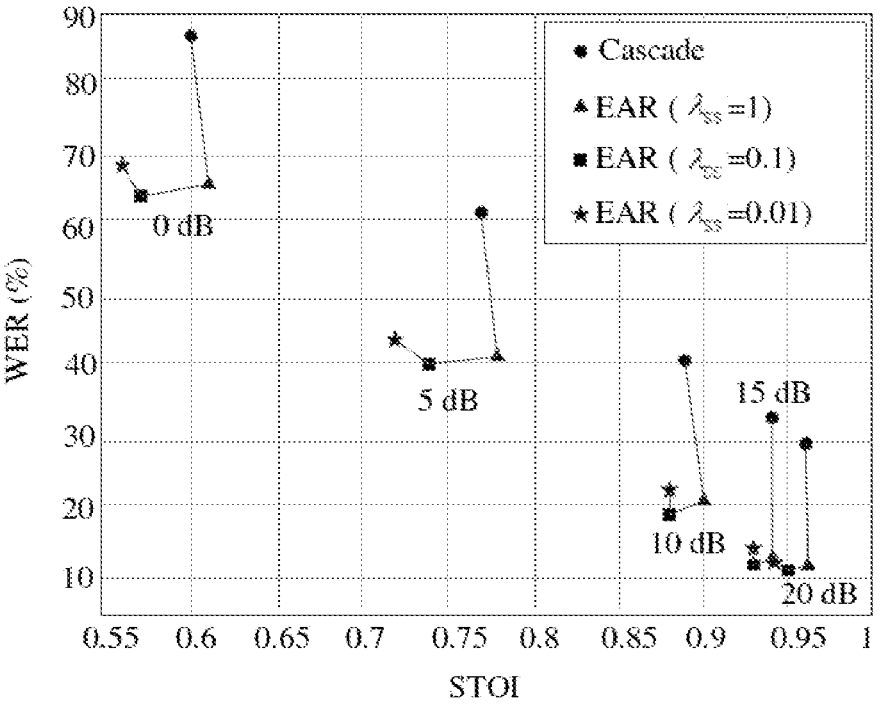
FIG. 9b is an example schematic diagram of comparing performance of different speech recognition systems under different SNR conditions according to an embodiment.

To make objectives, technical solutions, and advantages of this application clearer and more comprehensible, this application is further described in detail below with reference to the accompanying drawings and embodiments. It is to be understood that the specific embodiments described herein are merely example and are used merely for explaining this application, but are not intended to limit the scope of this application.

FIG. 1 is a diagram of an example application environment of a method for training a speech recognition model according to an embodiment. Referring to FIG. 1, the speech recognition method is applied to a model training system. The system for training the speech recognition model includes a terminal 110 and a server 120. The terminal 110 and the server 120 are connected by using a network. The terminal 110 may specifically be a desktop terminal or a mobile terminal. The mobile terminal may specifically implemented as at least one of a mobile phone, a tablet computer, a notebook computer, and the like. The server 120 may be implemented by using an independent server or a server cluster that includes a plurality of servers. Both the terminal 110 and the server 120 may be independently used to perform the speech recognition method provided in the embodiments of this application. Both the terminal 110 and the server 120 may cooperate to perform the speech recognition method provided in the embodiments of this application.

The solutions provided in the embodiments of this application relate to technologies such as speech recognition of artificial intelligence (AI). Key technologies of the speech technology include a speech separation (SS) technology, a speech enhancement (SE) technology, and an automatic speech recognition (ASR) technology. To make a computer capable of listening, seeing, speaking, and feeling constitutes a future development direction of human-machine interaction, and speech has become one of the most important human-machine interaction modes in the future.

The embodiments of this application relate to a joint model for speech processing. The joint model includes three models for speech processing in different links, and specifically includes a front-end speech separation and enhancement model, a back-end speech recognition model, and a robust (or robustness) representation model bridging between the speech separation and enhancement model and the speech recognition model. The three models may respectively be a machine learning model. The machine learning model refers to a model having a specific capability after sample learning, and specifically may be implemented as neural network models such as a convolutional neural network (CNN) model and a recurrent neural network (RNN) model. The machine learning model may alternatively be a model of another type. It is to be understood that, models used in each link may be flexibly selected before model training according to accuracy requirements and the like, so that an optimal configuration may be used in each link without compromising the performance of any link. In other words, the three models involved in this application may freely select a dedicated model expert in the corresponding field. The speech separation and enhancement model and the speech recognition model may be respectively pre-trained. Therefore, in this application, the joint model including the robust representation model may be trained based on the pre-trained speech separation and enhancement model and the speech recognition model, so that a converged joint model may be obtained by performing iterative training for a smaller quantity of times. For a pre-training process of the speech separation and enhancement model and the speech recognition model and a process in which the joint training is performed in combination with the robust representation model, reference may be made to detailed description in subsequent embodiments.

As shown in FIG. 2, in an example embodiment, a speech recognition method is provided. This embodiment is mainly described by using an example in which the method is applied to a computer device. The computer device may specifically be the terminal 110 or the server 120 shown in FIG. 1. Referring to FIG. 2, the example speech recognition method specifically includes the following steps:

S202: Obtain a first loss function of a speech separation and enhancement model and a second loss function of a speech recognition model.

The speech separation and enhancement model refers to a model configured to have a capability of speech separation and/or speech enhancement after training, and specifically is a model that is obtained by learning and training by using sample speech stream(s) as training data, and is configured to extract target speech from background interference of the sample speech stream. It is to be understood that the speech separation and enhancement model may alternatively have at least one of capabilities of performing preprocessing such as voice activity detection (VAD), echo cancellation, reverberation cancellation, or sound source positioning on a speech signal, which is not limited herein. The speech separation and enhancement model may be divided into a mono sound (single microphone) separation and enhancement model and an array (a plurality of microphones) separation and enhancement model according to the quantity of sensors and microphones. Methods for mono sound separation include speech separation and speech enhancement and computational auditory scene analysis (CASA). The speech separation and speech enhancement may estimate clear speech by analyzing all data of a target speech signal and an interference signal in mono mixed signals and performing noise estimation on noisy speech. Current speech separation and speech enhancement methods include a spectral subtraction method and the like. The CASA performs speech separation by using grouping cue based on a perception theory of auditory scene analysis. Main methods for array separation include but are not limited to beamforming, spatial filtering, or the like. The beamforming is to enhance a speech signal from a specific direction by using a proper array structure, thereby reducing the interference of speech signals from other directions, using for example, delay-and-sum beamforming. Speech separation and speech enhancement are human-oriented speech processing tasks. In the field of speech separation and speech enhancement, representation parameters are more effectively understood for human, such as a short time Fourier transform (STFT) spectrogram or modified discrete cosine transform (MDCT) that are generally used. Current performance measurement indicators of speech separation and speech enhancement include at least one of a perceptual evaluation of speech Quality (PESQ), a signal distortion rate (SDR), short time objective intelligibility (STOI), and the like. The STOI is highly related to subjective auditory intelligibility. The speech recognition model refers to an acoustic model having a capability of speech recognition after training, and specifically is a model that is obtained by learning and training by using the sample speech stream(s) as training data, and is configured to perform phoneme recognition on the sample speech stream. The speech separation and enhancement model and the speech recognition model may be separately pre-trained. The pre-trained speech separation and enhancement model and the speech recognition model each may include a fixed model structure and a model parameter. The speech recognition may be a machine-oriented speech processing task. In the fields involving automatic speech recognition, such as a smart speaker, a virtual personal digital assistant, and machine translation, representation parameters that can be more efficiently understood by the machine, such as mel fbanks and mel-frequency cepstral coefficients (MFCC), may be generally used. Current performance measurement indicators of the speech recognition model include but are not limited to a word error rate (WER), a character error rate (CER), or a sentence error rate (SER).

Specifically, when the joint model training needs to be performed, the computer device may obtain the pre-trained speech separation and enhancement model and the speech recognition model, a first loss function used during pre-training the speech separation and enhancement model, and a second loss function used during pre-training the speech recognition model. The loss functions are generally related to an optimization problem as a learning criterion. In other words, the model is solved, optimized, and evaluated by minimizing the loss function. For example, the loss function may be applied to parametric estimation of the model in statistics and machine learning. The first loss function used in pre-training the speech separation and enhancement model and the second loss function used in pre-training the speech recognition model may specifically be a mean-square error (MSE), a mean absolute error (MAE), a Log-Cosh loss, a quantile loss, or an ideal quantile loss. The first loss function and the second loss function may respectively be a combination of a plurality of loss functions.

S204: Perform back propagation based on the second loss function to train an intermediate model bridging between the speech separation and enhancement model and the speech recognition model, to obtain a robust representation model.

As described above, during speech processing, the representation parameters and performance measurement indicators used in the front-end speech separation task are human-oriented, that is, taking human subjective auditory intelligibility as an objective, whereas the representation parameters and performance measurement indicators used in the back-end speech recognition task are machine-oriented, that is, taking recognition accuracy of machine as an objective. Therefore, a difference between two representation categories needs to be bridged when the front-end and back-end speech processing tasks are fused. Bridging means that an object is located between at least two objects and connects the at least two objects. In other words, for an object B, the object bridging between an object A and an object C indicates that the object B is located between the object A and the object C, one end of the object B is connected to the object A, and the other end of the object B is connected to the object C. For the model, the intermediate model bridging between the speech separation and enhancement model and the speech recognition takes an output of the speech separation and enhancement model as an input data, processes the input data, and then pass its output to the speech recognition model as an input.

Referring to FIG. 3, FIG. 3 is a schematic diagram of a model architecture for bridging a speech separation and enhancement model and a speech recognition model based on a robust representation model according to an embodiment. As shown in FIG. 3, to overcome the difference between the two representation categories, in the embodiments of this application, a to-be-trained intermediate model is bridged between the speech separation and enhancement model and the speech recognition model. The trained intermediate model has robustness, and may be referred to as the robust representation model. The to-be-trained intermediate model, the pre-trained speech separation and enhancement model and speech recognition model may all be a model including artificial neural networks. The artificial neural networks (referred to as ANNs for short) may alternatively be referred to as neural networks (NNs) for short or referred to as a connection model. The ANNs may abstract human-brain neuron network from the perspective of information processing, to construct a specific model and form different networks in different connection manners. In engineering and academic circles, the ANNs may alternatively be directly referred to as neural networks or quasi-neural networks for short. The neural network model may be implemented as, for example, a convolutional neural network (CNN) model, a deep neural network (DNN) model, and a recurrent neural network (RNN) model. The speech separation and enhancement model may alternatively be implemented as a combination of a plurality of neural network models. The CNN may include a convolutional layer and a pooling layer. The DNN may include an input layer, a hidden layer, and an output layer. Some of the layers may be fully-connected to each other. The RNN is a neural network for modeling sequence data, that is, a current output of a sequence is also related to a previous output. A specific representation form is that the network may memorize previous information and apply the information to the calculation of the current output. In other words, nodes between the hidden layers are no longer unconnected, but are connected. In addition, an input of the hidden layer not only includes an output of the input layer, but also includes an output of the hidden layer at a previous moment. The RNN may be, for example, a long short-term memory (LSTM) neural network model, a bi-directional long short-term memory (BiLSTM) neural network model, or the like.

In an example embodiment, the speech separation and enhancement model for speech separation and enhancement may also be referred to as an extractor, the robust representation model for intermediate transitional representation learning may also be referred to as an adapter, and the speech recognition model for phoneme recognition may be alternatively referred to as a recognizer. In the following description, a speech processing system formed by the extractor, the adapter, and the recognizer may be referred to as an EAR system.

Specifically, the computer device determines a local descent gradient generated by the second loss function during each iteration according to a preset deep learning optimization algorithm. Specifically, the deep learning optimization algorithm may include one or more of a batch gradient descent (BGD) algorithm, a stochastic gradient descent (SGD) algorithm, a mini-batch gradient descent (MBGD) algorithm, an adaptive algorithm (AdaGrad) algorithm, a root mean square prop (RMSProp) algorithm, an adaptive moment estimation (Adam) algorithm, or the like. The local descent gradient is backpropagated to the intermediate model by the computer device, to update a model parameter corresponding to the intermediate model, and the training is ended until a preset training stop condition is met. Using the SGD algorithm as an example, assuming that $L_1$ and $L_2$ are respectively a first loss function and a second loss function, that $f(x, \Theta_{adapt})$ represents an intermediate model with an input x and a model parameter $\Theta_{adapt}$, y is an output target value corresponding to the speech recognition model when x is input to the intermediate model, and a sample speech stream includes n audio frames $\{x^{(1)}, \ldots, x^{(n)}\}$, a target corresponding to $x^{(i)}$ being $y^{(i)}$, a local descent gradient corresponding to each iteration is $g=\nabla_\Theta \Sigma_i L_2(f(x^{(i)}; \Theta_{adapt}) \cdot y^{(i)}/n$. Assuming that a learning rate of the SGD algorithm is $\eta$, the model parameter may be changed into $\Theta_{adapt}-\eta g$, and the changed model parameter is used as a current model parameter of the intermediate model to continuously perform iteration until the preset training stop condition is met. The training stop condition may be that a loss value of the second loss function reaches a preset minimum value, model performance of the intermediate model is not obviously improved after iteration is successively performed for a preset quantity of times, or the like.

In an example embodiment, during performing back propagation based on the second loss function to train an intermediate model, although training data is processed by the speech recognition model, there is no need to adjust and update the model parameter of the pre-trained speech recognition model. A user may freely and independently select the intermediate model, the speech separation and enhancement model, and the speech recognition model that are specifically used according to model preference, accuracy requirements, or the like. That is, the user is allowed to introduce new and advanced speech separation/enhancement and speech recognition technologies according to user implementation and capabilities. In other words, the three models involved in this application may freely select a dedicated model expert in the corresponding field. For example, a model expert in speech separation may include Ai, a model expert in robust representation learning may include Bj, and a model expert in speech recognition may include Ck, where i, j, and k are all positive integers, and a to-be-trained joint model may be any one of Ai+Bj+Ck. In this way, an optimal configuration may be used in each model without compromising performance of other models. In addition, the local descent gradient herein is relative to a global descent gradient involved in the joint training below, and may not be considered as some values of descent gradients determined according to the second loss function.

S206: Fuse the first loss function and the second loss function, to obtain a target loss function.

The target loss function is a comprehensive loss function obtained by combining the first loss function and the second loss function. Function fusion is a process of converting a plurality of functions into one function by performing one or more preset logical operations. The preset logical operation may include, but is not limited to, four mixed operations, weighted summation, or a machine learning algorithm.

Specifically, the computer device may obtain the target loss function by respectively performing the preset logical operation on the first loss function and the second loss function. Using weighted summation as an example, assuming that a weighting factor is $\lambda_{SS}$, the target loss function is $L=L_2+\lambda_{SS}L_1$. The weighting factor may be a value set according to experience or experiments, for example, may be set to 0.1. It may be easily found that importance of the speech separation and enhancement model in the joint training of a plurality of models may be adjusted by adjusting the weighting factor.

In an example embodiment, in the computer device, one or more fusion calculation formulas are preset, and an input format for each parameter factor in the fusion calculation formula is set. The first loss function and the second loss function are respectively inputted into different fusion calculation formulas as a parameter factor, so that different target loss functions may be obtained.

S208: Jointly train the speech separation and enhancement model, the robust representation model, and the speech recognition model based on the target loss function, and end the training when a preset convergence condition is met.

As described above, the speech separation and enhancement model, the robust representation model, and the speech recognition model are all models constructed by the ANNs. In this way, the model architecture for speech processing provided in this application is completely based on neural networks, so that end-to-end joint training may be realized. During entire end-to-end joint training, tasks will not be artificially divided, and an entire speech processing task is distributed to the neural network model to directly learn mapping from an original speech signal to an expected output. Specifically, the computer device determines the global descent gradient generated by the target loss function according to the preset deep learning optimization algorithm. For example, a loss value may be calculated based on the target loss function, and the global descent gradient may be determined based on the loss value. The deep learning optimization algorithm for determining the local descent gradient and the deep learning optimization algorithm for determining the global descent gradient may be the same or different. The global descent gradient generated by the target loss function may be sequentially backpropagated from the speech recognition model to each layer of the network of the robust representation model and the speech separation and enhancement model. In this process, model parameters corresponding to the speech separation and enhancement model, the robust representation model, and the speech recognition model are respectively iteratively updated, and the training is ended until the preset training stop condition is met.

In an example embodiment, the jointly training the speech separation and enhancement model, the robust representation model, and the speech recognition model based on the target loss function includes: determining the global descent gradient generated by the target loss function; and iteratively updating model parameters respectively corresponding to the speech separation and enhancement model, the robust representation model, and the speech recognition model according to the global descent gradient, until a minimum loss value of the target loss function is obtained.

Using a mini-batch stochastic gradient descent algorithm as an example, assuming that $L_1$ and $L_2$ are respectively a first loss function and a second loss function, L is a target loss function, $\Theta_{adapt}$ is a model parameter of a robust representation model, $\Theta_{extract}$ is a model parameter of a speech separation and enhancement model, $\Theta_{recog}$ is a model parameter of a speech recognition model, $\Theta_{EAR}$ is a model parameter of an entire joint model, and $\alpha$ is a learning rate of a mini-batch stochastic gradient descent algorithm, the global descent gradient generated by the target loss function may be continuously backpropagated to the speech separation and enhancement model $$\frac{\partial L}{\partial \Theta_{extract}} = \frac{\partial (L_2 + \lambda_{SS} L_1)}{\partial \Theta_{extract}} \frac{\partial \Theta_{extract}}{\partial \Theta_{adapt}} \frac{\partial \Theta_{adapt}}{\partial \Theta_{extract}},$$

and the model parameter may be changed into $$\Theta_{EAR} - \alpha \left\{ \frac{\partial L}{\partial \Theta_{extract}}, \frac{\partial L_2}{\partial \Theta_{adapt}}, \frac{\partial L_2}{\partial \Theta_{recog}} \right\},$$

and the changed model parameter may be used as a current model parameter of the joint model to perform iteration until the preset training stop condition is met. The training stop condition may be that a loss value of the target loss function reaches a preset minimum value, model performance of the intermediate model is not obviously improved after iteration is successively performed for a preset quantity of times, or the like.

In a specific embodiment, a batch size of the sample speech stream may be 24, an initial learning rate $\alpha$ may be $10^{-4}$, a decay coefficient of the learning rate may be 0.8. The joint model may be considered to be converged when the performance of the joint model is not improved after a loss of the target loss function has been successively iterated for three times, and the joint training is ended.

The foregoing speech recognition method provides a new end-to-end network architecture used for introducing the robust representation model for intermediate transition between the front-end speech separation and enhancement model and the back-end speech recognition model. Such architecture greatly bridges the difference between a human-oriented speech separation and enhancement task and a machine-oriented speech recognition task by introducing appropriate intermediate transitional representation. In such network architecture, the intermediate model completes training by backpropagating based on the second loss function of the back-end speech recognition model, and the speech separation and enhancement model and the speech recognition model may be pre-trained, so that the model may be converged after iterative training is performed for a relatively small quantity of times. The end-to-end network model is jointly trained respectively corresponding to a combination of the loss function based on the front-end and back-end models, so that each single model in the network architecture may comprehensively learn interference features of speech signals from the complex acoustic environment, thereby ensuring performance of a global speech processing task and improving accuracy of speech recognition. In addition, since each model in the network architecture is allowed to be freely and independently selected, each single model may achieve an optimal configuration without compromising any single model, so that the performance of each local speech processing task may be considered at the same time, and objective intelligibility of speech may be improved.

In an example embodiment, as shown in FIG. 4, the foregoing speech recognition method further may include a step of pre-training the speech separation and enhancement model, which is specifically as follows:

S402: Extract an estimated spectrum and an embedding feature matrix of a sample speech stream based on a first neural network model.

The first neural network model, and a second neural network model and a third neural network model mentioned below may be any one of the foregoing ANN models. In this embodiment, the first neural network model may be a model obtained by simplifying a deep attractor net (DANet) and a deep extractor net (DENet) based on an ideal ratio mask (IRM). The DENet includes one or more CNNs. In this embodiment, the CNN may adopt a BiLSTM network. The BiLSTM network is used for mapping the speech signal from a low-dimensional space to a high-dimensional space. The DANet is used for embedding an attractor into the high-dimensional space, to combine time-frequency information in the speech signal to participate in training together. In the process of joint training of the DENet and the DANet based on the backpropagation of the SGD, the DENet and the DANet do not introduce any time loss. The sample speech stream may be an audio data stream acquired in different complex acoustic environments based on a speech application in a device such as a vehicle-mounted system, a telephone conference device, a speaker device, or an online broadcasting device. The speech application may be a systematic phone application, an instant messaging application, a video conference application, a virtual speech assistant, a machine translation application, or the like. Each sample audio stream may include a plurality of audio frames. A sampling frequency of acquiring the audio frames in the sample audio stream, and a frame length and a frame shift of each audio frame may be freely set according to requirements. In a specific embodiment, audio frame acquisition may be performed with a sampling frequency of 16 kHZ, a frame length of 25 ms, and a frame shift of 10 ms.

Specifically, the computer device may perform the short time Fourier transform on a plurality of sample speech streams in batches, to obtain a speech feature and a speech spectrum of each sample speech stream. A batch size of the sample audio stream may be freely set according to requirements. For example, the batch size may be set to 24 or the like. The first neural network model for speech separation and enhancement can perform speech separation and enhancement well in a high-dimensional embedding space. Therefore, the computer device maps the speech feature of a batch of sample speech streams to a higher-dimensional embedding space, to obtain an embedding feature matrix through conversion. The computer device performs speech separation and enhancement on the speech spectrum in the embedding space based on the first neural network model, to obtain the estimated spectrum. The estimated spectrum is a spectrum of the sample speech stream outputted by the first neural network model.

S404: Determine an attractor corresponding to the sample speech stream according to the embedding feature matrix and a preset ideal masking matrix.

The ideal masking matrix refers to an adaptive perceptual masking matrix formed for constraining noise energy and speech distortion energy in the speech signal, in which masking thresholds corresponding to different speech frequencies are recorded. The ideal masking matrix may be obtained by prediction based on a low-dimensional speech feature and a high-dimensional embedding feature matrix of the speech signal. The attractor comprises a feature vector capable of representing a common feature of each sample speech stream in the embedding space. The speech separation and enhancement model based on the DANet is to calculate a weighted average value of the vector of a target speech training sample in the embedding space and store the value as an "attractor" of the target speech. Therefore, only one attractor may need to be calculated in the embedding space. Specifically, the computer device predicts the ideal masking matrix corresponding to the batch of sample speech streams according to the speech signal and the speech spectrum extracted from the speech signal by the short time Fourier transform. The ideal masking matrix and the embedding feature matrix are in the embedding space in the same dimension. The computer device calculates a product of the embedding feature matrix and the ideal masking matrix, and determines the attractor of the embedding space based on the product.

S406: Obtain a target masking matrix of the sample speech stream by calculating a similarity between each matrix element in the embedding feature matrix and the attractor.

Specifically, the computer device rectifies the masking threshold with reference to the similarity between the speech feature and the attractor, to reconstruct the ideal masking matrix and obtain the target masking matrix. Specifically, the method for measuring the similarity between each matrix element in the embedding feature matrix and the attractor may be performed by using a Euclidean distance, a Manhattan distance, a Chebyshev distance, a Mahalanobis distance, a cosine distance, a Hamming distance, or the like.

S408: Determine an enhanced spectrum corresponding to the sample speech stream according to the target masking matrix.

A speech signal acquired in a real acoustic scenario is usually a mixed signal having noise mixed in the target speech. The enhanced spectrum corresponding to the sample speech stream may be an enhanced spectrum of the target speech in the speech signal.

Specifically, to reduce the calculation amount of the robust representation model after bridging the speech separation and enhancement model, the high-dimensional embedding feature matrix may be subject to dimensionality reduction processing, and may be converted back to a low-dimensional enhanced spectrum.

S410: Train the first neural network model based on a mean-square error (MSE) loss between the estimated spectrum and the enhanced spectrum corresponding to the sample speech stream, to obtain the speech separation and enhancement model.

Specifically, the computer device calculates a mean-square error (MSE) loss between the enhanced spectrum of the batch of the sample speech stream and the enhanced spectrum of the target speech, and pre-trains the first neural network model by using the MSE loss:

$$L_{MSE} = \frac{1}{M} \sum_{t=1}^{M} \left\| S_S^{(i)} - \hat{S}_S^{(i)} \right\|_2^2$$

where M represents a batch size of a sample speech stream of a mixed signal used for training, i represents an index of training a sample speech stream, $\|\cdot\|_2$ represents 2-a norm of a vector, $S_S$ represents an estimated spectrum of a sample speech stream directly outputted by a first neural network model, and $\hat{S}_S$ represents an enhanced spectrum of a sample speech stream. The computer device backpropagates a gradient generated by a first loss function $L_1 = L_{MSE}$ to each layer of the network of the first neural network model, updates a model parameter $\Theta_{extract}$ of the first neural network model by using a mini-batch stochastic gradient descent algorithm, and ends the training until the preset convergence condition is met, to obtain the speech separation and enhancement model.

In this embodiment, the IRM is an effective method for speech separation and enhancement. The ideal masking matrix based on the IRM may constrain the noise energy and the speech distortion energy in the speech signal. The ideal masking matrix is reconstructed with reference to the high-dimensional embedding feature matrix corresponding to the speech signal and the attractor representing a common feature of the speech signal, and spectrum extraction is performed based on the reconstructed target masking matrix, so that the extracted estimated spectrum can be closer to the enhanced spectrum of the sample speech stream, and the effectiveness of spectrum extraction can be improved.

In an example embodiment, the extracting an estimated spectrum and an embedding feature matrix of a sample speech stream based on a first neural network model includes: performing Fourier transform on the sample speech stream, to obtain a speech spectrum and a speech feature of each audio frame; performing speech separation and enhancement on the speech spectrum based on the first neural network model, to obtain the estimated spectrum; and mapping the speech feature to an embedding space based on the first neural network model, to obtain the embedding feature matrix.

A speech signal acquired in a real acoustic scenario is usually a mixed signal having noise mixed with speech. It can be considered that a mixed signal x(n) is a linear superposition of a target speech signal $s_s(n)$ and an interference signal $s_f(n)$: $x(n)=s_s(n)+s_f(n)$, where n is the quantity of the sample speech stream. The mixed signal and a reference target speech signal are calculated by using the short time Fourier transform, so that the speech spectrum and the speech feature corresponding to the mixed signal may be obtained. The speech feature may be a feature matrix in a low-dimensional mixed signal space $R^{TF}$. A feature dimension of the speech feature extracted by using the Fourier transform is T×F dimensions. T is the quantity of frames, and F is the quantity of mel filter bands in the mel fbanks.

The DENet maps the speech feature from the mixed signal space $R^{TF}$ to a higher-dimensional embedding space $R^{TF*K}$ by using the BiLSTM network, so that the speech feature is outputted as an embedding feature matrix:

$$V = \varphi_{BiLSTM}(x, \theta_{extract}) \in R^{TF*K}.$$

A dimension K of an embedding vector for high-dimensional mapping may be freely set, for example, may be set to 40 or the like.

In an example embodiment, the first neural network model may be obtained by cascading a preset quantity of BiLSTM models in a peephole connection and a fully-connected layer. The peephole connection is a model connection manner different from common cascading, which may be used to obtain more context information. In a BiLSTM unit with a basic form, the control of gates in a forward LSTM and a backward LSTM has only a current input x(t) and a short-term state h(t−1) at a previous moment. Different BiLSTMs are connected through peepholes. A long-term state c(t−1) at a previous moment may be added to an input controlled by a forget gate and an input gate, and a current long-term state may be added to an input controlled by an output gate, so that the long-term state may be peeked by each control gate, and more context information can be obtained. For example, in a specific embodiment, a four-layer BiLSTM in a peephole connection may be used in the first neural network model. Each layer may include 600 hidden nodes, and a fully-connected layer may be connected to a last BiLSTM layer. The fully-connected layer may be configured to map a 600-dimensional speech feature vector to the high-dimensional embedding feature matrix. Assuming that a dimension K of the embedding feature matrix is 40, the 600-dimensional speech feature vector may be mapped to a 24000-dimensional embedding feature vector. In this embodiment, the low-dimensional speech feature of the speech signal is mapped to the high-dimensional embedding feature matrix, and thereby the effect of the speech separation and enhancement of the first neural network model may be ensured.

In an example embodiment, the determining an attractor corresponding to the sample speech stream according to the embedding feature matrix and a preset ideal masking matrix includes: determining the ideal masking matrix according to the speech spectrum and the speech feature; filtering out noise elements in the ideal masking matrix based on a preset binary threshold matrix; and determining the attractor corresponding to the sample speech stream according to the embedding feature matrix and the ideal masking matrix from which the noise elements have been filtered out.

A calculation formula of the attractor in the embedding space may be:

$$a_s = \frac{V^T(M_s \odot w)}{\sum_{t=1}^{T}\sum_{f=1}^{F}(M_s \odot w)},$$

where as $a_s \in R^K$, $\odot$ represents a matrix element multiplication, $M_s = |S_s|/|x|$ is an ideal masking matrix, $w \in R^{TF}$ is a binary threshold matrix, and a calculation formula of the binary threshold matrix is as follows:

$$w = \begin{cases} 1, & x_{t,f} < \max(x)/100 \\ 0, & \text{otherwise} \end{cases}.$$

The binary threshold matrix w is used for excluding matrix elements with excessively small energy in the ideal masking matrix, to reduce noise interference. Then, a masking matrix of the target speech, which is referred to as a target masking matrix for short, may be estimated by calculating the similarity between each matrix element in the embedding feature matrix and the attractor:

$$\hat{M}_S = \text{Sigmoid}(Va_s).$$

Finally, the enhanced spectrum of the target speech may be extracted by using the following calculation manner:

$$\hat{S}_S = x \odot M_s.$$

In an example embodiment, attractors calculated in a training stage of the first neural network model is stored, an average value of the attractors is calculated, and the average value is used as a global attractor in a test and production stage to extract the tested enhanced spectrum of the target speech stream.

In this embodiment, attractor calculation is performed after noise elements in the ideal masking matrix are filtered out, so that accuracy of the attractor calculation may be improved, and the calculated attractor may better reflect the speech feature of speech data.

In an example embodiment, as shown in FIG. 5, the foregoing speech recognition method may further include a step of constructing the intermediate model, which is specifically as follows:

S502: Obtain a second neural network model.

The second neural network model is a model bridging between the front-end speech separation and enhancement model and the back-end speech recognition model. The acoustic environment in this application is very complex, and the impact of errors in front-end speech recognition needs to be minimized when an inputted spectrogram is a defective spectrum including spectrum estimation errors and temporal distortions. In addition, temporal dynamic complexity of fusing front-end and back-end processing tasks is increased due to the context difference between frame-level spectrogram extraction and the phoneme-level speech recognition task. In other words, in this application, a joint model obtained by training is bridged based on the second neural network model, to adapt to more complex acoustic environments. To adapt to bottom-up and top-down temporal dynamic impacts, in the embodiments of this application, a more complex recurrent model architecture is used in the second neural network model. A typical recurrent model architecture includes a model structure capable of predicting points in a space of the outputted acoustic feature by using the content of the inputted spectrogram, e.g., the CNN or the BiLSTM. The BiLSTM model is generally referred to as a general program approximator, which may learn intermediate representations by effectively estimating a conditional posterior probability of an entire sequence without making any explicit assumptions about the distribution. The description is provided below by using an example in which a BiLSTM model structure $\psi_{BiLSTM}(\bullet)$ is used in the second neural network model.

In an example embodiment, the second neural network model may be obtained by connecting a preset quantity of BiLSTM models through peepholes. For example, in a specific embodiment, a two-layer BiLSTM in a peephole connection may be used in the second neural network model, and each layer has 600 hidden nodes.

S504: Perform non-negative constraint processing on the second neural network model, to obtain a non-negative neural network model.

The non-negative constraint processing is a processing step that may ensure that the second neural network model is non-negative. During bridging the front-end and back-end models based on a mel filter, fbanks outputted by the mel filter are non-negative. However, there is no non-negative limitation to an output of a standard BiLSTM. To fit the acoustic feature defined by an expert, in the embodiments of this disclosure, the non-negative constraint processing is performed on the second neural network model.

In an example embodiment, the performing non-negative constraint processing on the second neural network model includes: performing a squaring operation on the second neural network model. The second neural network model includes a BiLSTM network model.

Specifically, the computer device adds a squaring processing to the output of the second neural network model, to match non-negativity of the fbanks. It is found through evaluation that, the squaring processing has a simple calculation logic, and has a better effect of performing nonlinear transformation on the second neural network model compared with an activation function such as a rectified linear unit (ReLU) function.

S506: Obtain a differential model configured for performing auditory matching on an acoustic feature outputted by the non-negative neural network model; and cascading the differential model and the non-negative neural network model, to obtain the intermediate model.

The auditory matching refers to simulating an operation of human ears to enable the acoustic feature to be fit for human hearing habits. The differential model is an operation formula for simulating the operation of human ears. It is found through research that, for high-amplitude speech signals and low-amplitude speech signals with a very large spectral amplitude difference, the difference that the human ears can perceive may not be as obvious as the amplitude difference. For example, for two speech signals with amplitudes of 1000 and 10, the difference that the human ears can perceive may only be the difference between 3 and 1. In addition, the human ears are more sensitive to changes of the speech signal.

Specifically, the computer device obtains a pre-constructed differential model, and cascades the differential model after a non-negative neural network model as a step of performing auditory matching optimization processing on the acoustic feature outputted by the non-negative neural network model, to obtain the intermediate model. In other words, the intermediate model includes the non-negative neural network model and the differential model. In this case, a logic of simulating the operation of human ears is embodied in a form of the differential model. In a training stage, there is no need for the second neural network model to learn the logic of simulating the operation of human ears, so that learning complexity of the second neural network model is reduced, and training efficiency of the intermediate model is improved. In another embodiment, the second neural network model may be directly used as the intermediate model without performing non-negative constraint processing on the second neural network model and splicing the differential model. In this case, in the training stage, the second neural network model needs to learn the logic of simulating the operation of human ears by itself. It is found through tests that, compared with the non-negative constraint processing logic and the differential model determined according to expert experience, self-learning based on the second neural network model may instead learn more comprehensively the logic of simulating the operation of human ears, achieving a better effect of auditory matching. The second neural network model (i.e., the robust representation model) that has been trained in the test and production stage may adapt to a larger quantity of more complex acoustic environments. In this embodiment, non-negative constraint processing is performed on the second neural network model, and the differential model for simulating the operation of human ears is spliced, so that the acoustic feature outputted by the model may be fitter for actual hearing habits of human ears, thereby improving the performance of speech recognition of an entire EAR system.

In an example embodiment, the obtaining a differential model configured for performing auditory matching on an acoustic feature outputted by the non-negative neural network model, which may be further included in the foregoing speech recognition method, includes: obtaining a logarithmic model configured for performing a logarithmic operation on a feature vector corresponding to the acoustic feature; obtaining a difference model configured for performing a difference operation on the feature vector corresponding to the acoustic feature; and constructing the differential model according to the logarithmic model and the difference model. The logarithmic model is configured to perform a logarithmic operation on a feature vector element of the acoustic feature outputted by the non-negative neural network model. The logarithmic model may be any model capable of implementing the element logarithmic operation, such as lg x and ln x, where x is a vector element of an acoustic feature. As described above, for high-amplitude speech signals and low-amplitude speech signals with a very large spectral amplitude difference, the difference that the human ears can perceive may not be as obvious as the amplitude difference. Performing the logarithmic operation on the feature vector element of the acoustic feature based on the logarithmic model may reduce a difference between amplitudes, so that the difference between different vector elements of the acoustic feature may better reflect a signal difference that can be practically perceived by the human ears. For example, in the foregoing example, for the two speech signals with amplitudes of 1000 and 10, the vector element 1000 is converted to 3, and the vector element 10 is converted to 1 after the logarithmic operation lg x is performed, which well reflects the signal difference that can be practically perceived by the human eras. The difference model is configured to perform a difference operation on the feature vector element of the acoustic feature outputted by the non-negative neural network model. The difference model may be any model capable of implementing the element difference operation, such as a first-order difference operation model and a second-order difference operation model. As described above, the human ears are more sensitive to changes of the speech signal. The difference operation is performed on the feature vector element of the acoustic feature based on the difference model, and a difference result reflects changes between different vector elements of the acoustic feature.

Specifically, the computer device may use the logarithmic model and the difference model as two coordinate models to construct the differential model, or may cascade the logarithmic model and the difference model to construct the differential model. A cascading sequence of the logarithmic model and the difference model may be that the logarithmic model is cascaded after the difference model, or may be that the difference model is cascaded after the logarithmic model. It is to be understood that the differential model may include other models for auditory matching, which is not limited thereto. The computer device fixes the model parameter of the speech recognition model after the speech recognition model has been pre-trained, continues to use spectrum with clean speech as training data, and trains the intermediate model by performing direct backpropagation on the second loss function $L_2$.

$$\frac{\partial L_2}{\partial \Theta_{adapt}} = \frac{\partial L_2}{\partial \hat{F}_{adapt}} \frac{\partial \hat{F}_{adapt}}{\partial \hat{F}} \frac{\partial \hat{F}}{\partial \Theta_{adapt}},$$

where $\Theta_{adapt}$ is a model parameter of an intermediate model, $\hat{F}_{adapt}$ is an intermediate model obtained by performing the non-negative constraint processing on the second neural network model and splicing the differential model; and $\hat{F}$ is a second neural network model.

In an example embodiment, to achieve faster convergence and better generalization, the computer device may perform global mean variance normalization processing on the vector element of the acoustic feature. The method used for normalization processing may specifically be 01 standardization, Z-score standardization, sigmoid function standardization, or the like.

In an example embodiment, to achieve a better speech smoothing effect, the computer device may further splice acoustic features, centered on a current audio frame of the sample audio stream, of all audio frames in a context window of 2W+1 frames. Here, W represents a size of one side of the context window, and a specific size may be freely set according to requirements, for example, may be set to 5.

In this embodiment, the logarithmic operation is performed on the non-negative neural network model, so that the difference between different vector elements of the acoustic feature of the speech signal may better reflect a signal difference that can be practically perceived by the human ears. Performing the difference operation on the non-negative neural network model may reflect changes between different vector elements of the acoustic feature, to further adapt to an auditory feature in which human ears are more sensitive to changes of the speech signal.

In an example embodiment, as shown in FIG. 6, the foregoing speech recognition method further includes a step of pre-training the speech recognition model, which is specifically as follows:

S602: Obtain a sample speech stream and corresponding phoneme categories that are annotated.

Each audio frame in the sample speech stream has corresponding annotation data. The annotation data includes phoneme categories corresponding to the audio frame determined according to an output user or speech content of the target speech in the audio frame.

S604: Extract a depth feature of each audio frame of the sample speech stream by using the third neural network model.

The third neural network model in this embodiment may be an acoustic model implemented based on CLDNN (a network obtained by fusing the CNN, the LSTM, and the DNN). Batch normalization may be performed on the output of a CNN layer and a LSTM layer, to achieve faster convergence and better generalization.

Specifically, the computer device extracts the depth feature of each audio frame of the sample speech stream by using the third neural network model. The third neural network model includes a softmax layer. The computer device may determine a probability that a robust feature vector element belongs to each phoneme category based on the softmax layer.

In an example embodiment, depth features, centered on a current audio frame of the sample audio stream, of all audio frames in a context window of 2W+1 frames may be spliced, and a splicing result is used as a depth feature of the current audio frame. In this way, the depth feature capable of reflecting the context information may be obtained, and accuracy of the third neural network model is improved.

S606: Determine a center vector of the sample speech stream according to depth features corresponding to audio frames of all the phoneme categories.

S608: Determine a fusion loss between an inter-class confusion measurement index and an intra-class distance penalty index of each audio frame based on the depth features and the center vector.

The center vector is used for describing centers of all depth features in a target category. The inter-class confusion measurement index of the audio frame refers to a parameter used for representing a possibility that the sample speech stream belongs to the target category, and may reflect the discrimination between different target categories. A smaller inter-class confusion measurement index indicates stronger inter-class discrimination. The inter-class confusion measurement index may be obtained by calculating the Euclidean distance, or obtained by calculating algorithms of other distance types, such as an angular distance. The intra-class distance penalty index refers to a parameter used for representing compactness of intra-class distribution of the sample speech stream. The classification performance of the third neural network model may be improved by a penalty of intra-class distance, that is, intra-class discrimination performance is met by compacting the intra-class distribution. A smaller intra-class distance penalty index indicates stronger compactness, and the intra-class discrimination performance may be improved. The intra-class distance penalty index may be implemented by using a center loss function, but is not limited thereto. For example, the intra-class distance penalty index may alternatively be calculated by using Contrastive loss function, Triplet loss function, Sphere face loss function, and CosFace loss function in which the angular distance is used.

Specifically, the computer device fuses the inter-class confusion measurement index and the intra-class distance penalty index in a manner of performing weighted calculation on the inter-class confusion measurement index and the intra-class distance penalty index according to the preset weight factor:

$$L_{CL} = L_{ce} + \lambda_{CL} L_{ct},$$

where $L_{CL}$ is a fusion loss, $L_{ce}$ is an inter-class confusion measurement index, $L_{ct}$ is an intra-class distance penalty index, and $\lambda_{CL}$ is a weight factor.

S610: Train the third neural network model based on the fusion losses, to obtain the speech recognition model.

Specifically, the computer device determines the global descent gradient generated by the target loss function according to the preset deep learning optimization algorithm. The global descent gradient generated by the target loss function is sequentially backpropagated from the speech recognition model to each layer of the network of the robust representation model and the speech separation and enhancement model:

$$\frac{\partial L}{\partial \Theta_{extract}} = \frac{\partial (L_{CL} + \lambda_{SS} L_{MSE})}{\partial \hat{F}_{adapt}} \frac{\partial \hat{F}_{adapt}}{\partial \hat{F}} \frac{\partial \hat{F}}{\partial \hat{M}_s} \frac{\partial \hat{M}_s}{\partial V} \frac{\partial V}{\partial \Theta_{extract}}.$$

In the EAR system, a high-dimensional embedding feature matrix V may be generated by the extractor based on the DENet through the BiLSTM network to predict a target floating value masking $\hat{M}_s$ suitable for the target speech, $\hat{M}_s$ may be used for calculating an MSE between the estimated spectrum outputted by the extractor and the enhanced spectrum of the target speech, a robust feature for the target speech is generated, and the robust feature predicts a speech unit continuously by using the adapter and the recognizer. To make the model parameter of the extractor accurately estimate a target speech spectrum while reducing the error rate of speech recognition as much as possible, in this application, parameters of the DENet are updated in a manner of multitasking joint training. A multitasking joint loss function (that is, the target loss function) is a weighted combination of the first loss function in the speech separation task and the second loss function of the speech recognition task. The weight of the cross entropy and a center loss and an MSE of the spectrum may be simultaneously calculated in a forward process of the DENet, so that a gradient of the model parameter of each loss function may be obtained by performing back propagation. "Importance" of the speech separation task during multitasking training may be adjusted after the weighting factor is added. In this embodiment, a center point of each category in a space of the depth feature may be learned and updated based on the center loss, an intra-class distance between the depth feature and the center point of the depth feature of the corresponding target category is penalized, so that an error rate of speech recognition in an unseen acoustic environment may be greatly reduced, and a generalization capability of the speech recognition to noise variability may be effectively improved, and a lower error rate may be obtained in a clean speech condition, a seen acoustic environment and an unseen acoustic environment during training; and the standard of the sample speech stream may have better robustness in a new acoustic environment, and speech recognition may be stably and reliably completed even encountering different users with a new accent and background noise in the new acoustic environment.

In an example embodiment, the determining a fusion loss between an inter-class confusion measurement index and an intra-class distance penalty index of each audio frame based on the depth features and the center vector includes: inputting the depth features into a cross entropy function and calculating the inter-class confusion measurement index of each audio frame; inputting the depth features and the center vector into a center loss function and calculating the intra-class distance penalty index of each audio frame; and performing a fusion operation on the inter-class confusion measurement index and the intra-class distance penalty index, to obtain the fusion loss.

The cross entropy function is used for ensuring the inter-class discrimination of the depth feature. A formula for calculating the cross entropy function may be as follows:

$$L_{ce} = \frac{1}{MT} \sum_{t=1}^{M} \sum_{t=1}^{T} -Y_t^{(K_i)} \log \hat{Y}_t^{(K_i)},$$

where $L_{ce}$ represents an inter-class confusion measurement index, M represents a batch size of a sample speech stream used for training, and T represents a quantity of frames of an audio frame in a sample speech stream.

$$Y_t^{(K_i)}$$

represents an output of the output layer of third neural network model on the $i^{th}$ node after performing a softmax operation. There are K output nodes in the third neural network model, indicating that there are K output categories.

$$Y_t^{(K_i)} = \frac{e^{a_t^{Ki}}}{\sum_{j=1}^{K} e^{a_t^j}}, \text{ and } a_t = W u_t + B, \text{ where}$$

$a_t$ represents an output of a previous layer of the softmax layer of the third neural network model at the $t^{th}$ audio frame, $$a_t^j$$

represents an output of a $j^{th}$ node at a previous layer of the softmax layer at the $t^{th}$ audio frame, W represents a weight matrix of the softmax layer, and B represents a bias vector of the softmax layer.

A formula for calculating the center loss function may be as follows:

$$L_{ct} = \sum_t \|u_t^{(i)} - c_{Kt}^{(i)}\|_2^2,$$

where $L_{ct}$ represents an intra-class distance penalty index;

$$u_t^{(i)}$$

represents a depth feature of the $t^{th}$ audio frame, that is, an output of a penultimate layer of the third neural network model at the $t^{th}$ audio frame; and $$c_{Kt}^{(i)}$$

represents a center vector of the $Kt^{th}$ type of the depth feature, and i represents an index of a sample speech stream. The calculation of the center loss is intended to reduce a distance between the depth feature of the audio frame and the center vector of the audio frame as much as possible, that is, a smaller intra-class distance $u_t - c_{Kt}$ is better.

Specifically, the computer device fuses the cross entropy loss function and the center loss function, to obtain the second loss function corresponding to the speech recognition model. In an example embodiment, the cross entropy loss function and the center loss function are fused in a manner of performing weighted calculation on the cross entropy loss function and the center loss function according to the preset weight factor:

$$L_{CL} = L_{ce} + \lambda_{CL} L_{ct},$$

where $L_{CL}$ represents a second loss function, and $\lambda_{CL}$ represents a hyperparameter for controlling a weight of the center loss function occupied in the second loss function. Correspondingly, the computer device fuses the inter-class confusion measurement index and the intra-class distance penalty index in a manner of performing weighted calculation on the inter-class confusion measurement index and the intra-class distance penalty index according to the preset weight factor $\lambda_{CL}$.

In this embodiment, the center point of each category in the space of the depth feature may be learned and updated by using the center loss function, and the distance between the depth feature and the center point of the depth feature of the corresponding category is penalized, so that a distinguishing capability of the depth feature is improved.

In a specific embodiment, as shown in FIG. 7, the speech recognition method specifically includes the following steps:

S702: Perform Fourier transform on the sample speech stream, to obtain a speech spectrum and a speech feature of each audio frame.

S704: Perform speech separation and speech enhancement on the speech spectrum based on the first neural network model, to obtain the estimated spectrum.

S706: Map the speech feature to an embedding space based on the first neural network model, to obtain the embedding feature matrix.

S708: Determine an ideal masking matrix according to the speech spectrum and the speech feature.

S710: Filter out noise elements in the ideal masking matrix based on a preset binary threshold matrix.

S712: Determine the attractor corresponding to the sample speech stream according to the embedding feature matrix and the ideal masking matrix from which the noise elements have been filtered out.

S714: Obtain a target masking matrix of the sample speech stream by calculating a similarity between each matrix element in the embedding feature matrix and the attractor.

S716: Determine an enhanced spectrum corresponding to the sample speech stream according to the target masking matrix.

S718: Calculate an MSE loss between the estimated spectrum and the enhanced spectrum corresponding to the sample speech stream based on the first loss function.

S720: Train the first neural network model based on the MSE loss, to obtain the speech separation and enhancement model.

S722: Obtain a sample speech stream and corresponding phoneme categories that are annotated.

S724: Extract a depth feature of each audio frame of the sample speech stream by using the third neural network model.

S726: Determine a center vector of the sample speech stream according to depth features corresponding to audio frames of all the phoneme categories.

S728: Input the depth features into a cross entropy function and calculate the inter-class confusion measurement index of each audio frame.

S730: Input the depth features and the center vector into a center loss function and calculate the intra-class distance penalty index of each audio frame.

S732: Perform a fusion operation on the inter-class confusion measurement index and the intra-class distance penalty index, to obtain a fusion loss based on the second loss function.

S734: Train the third neural network model based on the fusion losses, to obtain the speech recognition model.

S736: Obtain a first loss function of a speech separation and enhancement model and a second loss function of a speech recognition model.

S738: Obtain a second neural network model.

S740: Perform non-negative constraint processing on the second neural network model, to obtain a non-negative neural network model.

S742: Obtain a differential model configured for performing auditory matching on an acoustic feature outputted by the non-negative neural network model.

S744: Cascade the differential model and the non-negative neural network model, to obtain the intermediate model.

S746: Perform back propagation based on the second loss function to train an intermediate model bridged between the speech separation and enhancement model and the speech recognition model, to obtain a robust representation model.

S748: Fuse the first loss function and the second loss function, to obtain a target loss function.

S750: Determine a global descent gradient generated by the target loss function.

S752: Iteratively update model parameters respectively corresponding to the speech separation and enhancement model, the robust representation model, and the speech recognition model according to the global descent gradient, until a minimum loss value of the target loss function is obtained.

The front-end speech separation and enhancement model and the back-end speech recognition model are connected by using the robust representation module $\psi_{BiLSTM}(\bullet)$, so that the entire EAR system becomes a network capable of implementing end-to-end back propagation, and a "curriculum learning" training method may be used for the network of the entire EAR system due to a modular architecture. In other words, the back propagation is performed based on the loss function of the back-end speech recognition model, to train the robust representation model separately, and then end-to-end joint training is performed on the network of the entire EAR system. Since the training may be performed based on the pre-train speech separation and enhancement model and the speech recognition model, the convergence may be quickly achieved by using the "curriculum learning" training method.

In the foregoing speech recognition method, the joint model obtained by training based on the speech recognition method provided in this application has a strong learning capability due to a strong network structure and the "curriculum learning" training method, effective robust representations of speech enhancement and speech separation are extracted, to adapt to any challenging and complex interference acoustic environment.

As shown in FIG. 8, in an example embodiment, a speech recognition method is provided. This embodiment is mainly described by using an example in which the method is applied to a computer device. The computer device may specifically be the terminal 110 or the server 120 shown in FIG. 1. Both the terminal 110 and the server 120 may be used independently to perform the speech recognition method provided in the embodiments of this application. Both the terminal 110 and the server 120 may be used in cooperation to perform the speech recognition method provided in the embodiments of this application. Referring to FIG. 8, the speech recognition method specifically includes the following steps:

S802: Obtain a target speech stream.

The target speech stream may be an audio data stream acquired in any actual acoustic environment. The target speech stream may be pre-acquired and stored in the computer device, or may be dynamically acquired by the computer device. For example, the target speech stream may be an audio data stream generated by the user based on a game application during a game voice call. In this case, the target speech stream may be echo interference including game background music and human voices from a remote end. Specifically, the computer device obtains a target speech stream and acquires an audio frame from the target speech stream according to a preset sampling frequency. A frame length of each audio frame and frame shifts of adjacent audio frames may be freely set according to requirements. In a specific embodiment, the computer device acquires the audio frame with a sampling frequency of 16 kHZ, a frame length of 25 ms, and a frame shift of 10 ms.

S804: Extract an enhanced spectrum of each audio frame of the target speech stream based on a speech separation and enhancement model.

The speech separation and enhancement model may include a neural network model, and may specifically be a model obtained by simplifying a deep attractor net (DANet) and a deep extractor net (DENet) based on an ideal ratio mask (IRM). In a specific embodiment, a four-layer BiL-STM in a peephole connection may be used in the speech separation and enhancement model. Each layer has 600 hidden nodes, and the fully-connected layer is connected to a last BiLSTM layer. Specifically, the computer device may perform the short time Fourier transform on a plurality of target speech streams in batches, to obtain a speech feature and a speech spectrum of each target speech stream. the computer device maps the speech feature of a batch of target speech streams to a higher-dimensional embedding space based on the speech separation and enhancement model, performs speech separation and speech enhancement on the speech spectrum in the embedding space, to obtain an embedding feature matrix. The computer device obtains pre-stored global attractors. In the stage of training the speech separation and enhancement model, the computer device stores the attractors calculated according to the batch of sample speech streams, calculates an average value of the attractors, and uses the average value as a global attractor in the test and production stage. The computer device calculates the similarity between the global attractor and each matrix element in the embedding feature matrix corresponding to the target speech stream, to obtain a target masking matrix of the target speech stream. The enhanced spectrum of the target speech stream may be extracted based on the target masking matrix and the embedding feature matrix.

S806: Perform auditory matching on the enhanced spectrum based on a robust representation model to obtain a robust feature.

The robust representation model is a neural network model bridged between the front-end speech separation and enhancement model and the back-end speech recognition model, and may specifically be a CNN or a BiLSTM based on the recurrent model architecture which is capable of adapting to bottom-up and top-down temporal dynamic impacts. In a specific embodiment, the robust representation model may be a two-layer BiLSTM in a peephole connection, and each layer has 600 hidden nodes. The robust feature is an intermediate transition feature obtained by converting the enhanced spectrum outputted by the front-end speech separation and enhancement model. The intermediate transition feature is used as an input of the back-end speech recognition model.

Specifically, the computer device obtains an acoustic feature of the enhanced spectrum based on the robust representation model. To be fit for human hearing habits, the robust representation model performs auditory matching on the acoustic feature of the enhanced spectrum. The computer device performs non-negative constraint processing on the acoustic feature based on the robust representation model, and performs differential operations such as a logarithmic operation and a difference operation on the acoustic feature after the non-negative constraint processing, to obtain the robust feature. For example, for high-amplitude speech signals and low-amplitude speech signals with a very large spectral amplitude difference, the difference that the human ears can perceive may not be as obvious as the amplitude difference. Performing the logarithmic operation on the feature vector element of the acoustic feature based on the logarithmic model may reduce a difference between amplitudes, so that the difference between different vector elements of the acoustic feature may better reflect a signal difference that can be practically perceived by the human ears. The human ears are more sensitive to changes of the speech signal. The difference operation is performed on the feature vector element of the acoustic feature based on the difference model, and a difference result reflects changes between different vector elements of the acoustic feature.

S808: Recognize the robust feature based on a speech recognition model, to obtain a phoneme corresponding to each audio frame. The speech separation and enhancement model, the robust representation model, and the speech recognition model are obtained by joint training.

The speech recognition model, and the speech separation and enhancement model and the robust representation model mentioned above may be obtained by joint pre-training. The front-end speech separation and enhancement model and the back-end speech recognition model may be pre-trained. The computer device obtains the first loss function of the speech separation and enhancement model and the second loss function of the speech recognition model, and calculates a loss value based on the second loss function, so that back propagation is performed based on the loss value, and the intermediate model bridged between the speech separation and enhancement model and the speech recognition model is trained, to obtain the robust representation model. The computer device further fuses the first loss function and the second loss function, jointly trains the speech separation and enhancement model, the robust representation model, and the speech recognition model based on the fused target loss function, and ends the training until the preset convergence condition is met. Specifically, the computer device inputs the robust feature into the speech recognition model, to obtain a phoneme corresponding to the target speech stream. In the embodiments of this application, the speech recognition model may recognize about 20,000 phoneme categories. The speech recognition model processes the robust feature of the inputted batch of target speech streams, and outputs a phoneme vector of about 20,000 dimensions. There is a correspondence between the robust feature vector element and a phoneme vector element. The phoneme vector records the probability that a robust feature vector element belongs to each phoneme category, so that a phoneme string when each robust feature vector element corresponds to a phoneme category with the highest probability can be determined, to implement speech recognition on the target speech stream based on the phoneme category.

The foregoing speech recognition method provides a new end-to-end network architecture used for introducing the robust representation model between the front-end speech separation and enhancement model and the back-end speech recognition model. Such architecture greatly bridges the difference between a human-oriented speech separation and enhancement task and a machine-oriented speech recognition task by introducing appropriate intermediate transitional representation technologies. The end-to-end network model is jointly trained, so that each single model in the network architecture may comprehensively learn interference features of speech signals from the complex acoustic environment, thereby ensuring performance of a global speech processing task and improving accuracy of speech recognition. In addition, since each model in the network architecture is allowed to be freely and independently selected, each single model may achieve an optimal configuration without compromising any single model, so that the performance of each local speech processing task may be considered at the same time, and objective intelligibility of speech may be improved.

In an example embodiment, the speech separation and enhancement model includes a first neural network model. The extracting an enhanced spectrum of each audio frame of the target speech stream based on a speech separation and enhancement model includes: extracting an embedding feature matrix of each audio frame of the target speech stream based on the first neural network model; determining an attractor corresponding to the target speech stream according to the embedding feature matrix and a preset ideal masking matrix; obtaining a target masking matrix of the target speech stream by calculating a similarity between each matrix element in the embedding feature matrix and the attractor; and determining the enhanced spectrum corresponding to the each audio frame of the target speech stream according to the target masking matrix. The speech separation and enhancement model may be obtained by training the first neural network model. For the process of extracting an enhanced spectrum of each audio frame of the target speech stream based on a speech separation and enhancement model, reference may be made to the description of the foregoing steps S402 to S410. Details are not described herein again.

In an example embodiment, the robust representation model includes a second neural network model and a differential model. The performing auditory matching on the enhanced spectrum based on a robust representation model to obtain a robust feature includes: extracting an acoustic feature from the enhanced spectrum based on the second neural network model; performing non-negative constraint processing on the acoustic feature, to obtain a non-negative acoustic feature; and performing a differential operation on the non-negative acoustic feature based on the differential model, to obtain the robust feature matching auditory habits of human ears. The intermediate model may be obtained by splicing the second neural network model and the differential model, and the robust representation model is obtained by training the intermediate model. For the process of extracting the robust feature based on the robust representation model, reference may be made to the foregoing steps S502 to S506. Details are not described herein again.

In an example embodiment, for speech from two acoustic environments "interfered by background music" and "interfered by other speakers", WERs based on different speech recognition methods are tested and compared under five SNR conditions (0 dB, 5 dB, 10 dB, 15 dB, and 20 dB). Test results are shown in FIG. 9a, speech recognition is performed based on the EAR system provided in this application, both in cases that a single task $\lambda_{SS}=0$ and a multi-task $\lambda_{SS}\neq0$ (for example, $\lambda_{SS}=0.1$), the WER is consistently superior to other speech recognition systems, such as a speech recognition model, a speech separation and enhancement model, and a cascading system of the speech recognition model that are trained based on clean speech or interference speech.

Referring to FIG. 9b, FIG. 9b is a schematic diagram of comparing performance of different speech recognition systems during recognition tasks in a single-channel with multi-speakers under different SNR conditions according to an embodiment. As shown in FIG. 9, under different multi-task training weights, compared with the manner in which the speech separation and enhancement model is directly cascaded before the speech recognition model for preprocessing, the EAR system provided in this application has excellent performance of both the STOI and the WER (%). In other words, the EAR system may greatly improve machine-oriented speech clarity while maintain speech intelligibility for reflecting human hearing and achieving comparable or better performance than the DENet as a dedicated speech separation model.

The embodiments of this application disclose, for the first time, the importance of a process of introducing appropriate intermediate transitional representation learning to bridge the difference between human-oriented and machine-oriented speech processing tasks, which may simultaneously ensuring optimal performance (human subjective auditory intelligibility) of a front-end speech separation local task and a back-end speech recognition local task and optimal performance (such as an index of machine recognition accuracy) of a global task. For example, in an application scenario of game real-term call, during calling in teams, there are both near-end voices of a speaker and background music played by mobile phones during the game. In the ERA system provided in this specification, noise is better constrained based on the robust representation model, and the echo interference of game background music and human voices from the remote end may be resolved. Echo cancellation for background music ensures the quality of the voice call between the users. In addition to greatly improving performance, the EAR system provided in this application has high flexibility: any advanced speech separation and enhancement model and speech recognition model may be flexibly integrated to replace corresponding modules in an EAR system framework, and end-to-end trainable framework provided in this application will not damage performance of any single module.

In a specific embodiment, as shown in FIG. 10, the speech recognition method specifically includes the following steps:

S1002: Obtain a target speech stream.

S1004: Extract an embedding feature matrix of each audio frame of the target speech stream based on the speech separation and enhancement model.

S1006: Determine an attractor corresponding to the target speech stream according to the embedding feature matrix and a preset ideal masking matrix.

S1008: Obtain a target masking matrix of the target speech stream by calculating a similarity between each matrix element in the embedding feature matrix and the attractor.

S1010: Determine the enhanced spectrum corresponding to each audio frame of the target speech stream according to the target masking matrix.

S1012: Obtain a robust representation model. The robust representation model includes a second neural network model and a differential model.

S1014: Extract an acoustic feature from the enhanced spectrum based on the second neural network model.

S1016: Perform non-negative constraint processing on the acoustic feature, to obtain a non-negative acoustic feature.

S1018: Perform a differential operation on the non-negative acoustic feature based on the differential model, to obtain the robust feature matching auditory habits of human ears.

S1020: Recognize the robust feature based on the speech recognition model, to obtain a phoneme corresponding to each audio frame. The speech separation and enhancement model, the robust representation model, and the speech recognition model are obtained by joint training.

The foregoing speech recognition method provides a new end-to-end network architecture used for introducing the robust or robustness representation model between the front-end speech separation and enhancement model and the back-end speech recognition model. Such architecture greatly bridges the difference between a human-oriented speech separation and enhancement task and a machine-oriented speech recognition task by introducing appropriate intermediate transitional representation technologies. The end-to-end network model is jointly trained, so that each single model in the network architecture may comprehensively learn interference features of speech signals from the complex acoustic environment, thereby ensuring performance of a global speech processing task and improving accuracy of speech recognition. In addition, since each model in the network architecture is allowed to be freely and independently selected, each single model may achieve an optimal configuration without compromising any single model, so that the performance of each local speech processing task may be considered at the same time, and objective intelligibility of speech may be improved.

The steps in the foregoing flowchart are sequentially shown according to indication of an arrow, the steps are not necessarily sequentially performed according to a sequence indicated by the arrow. Unless clearly specified in this specification, there is no strict sequence limitation on the execution of the steps, and the steps may be performed in another sequence. In addition, at least some steps in the foregoing flowcharts may include a plurality of sub-steps or a plurality of stages. The sub-steps or the stages are not necessarily performed at the same moment, but may be performed at different moments. The sub-steps or the stages are not necessarily performed in sequence, but may be performed in turn or alternately with another step or at least some of sub-steps or stages of the another step.

Figure 11:
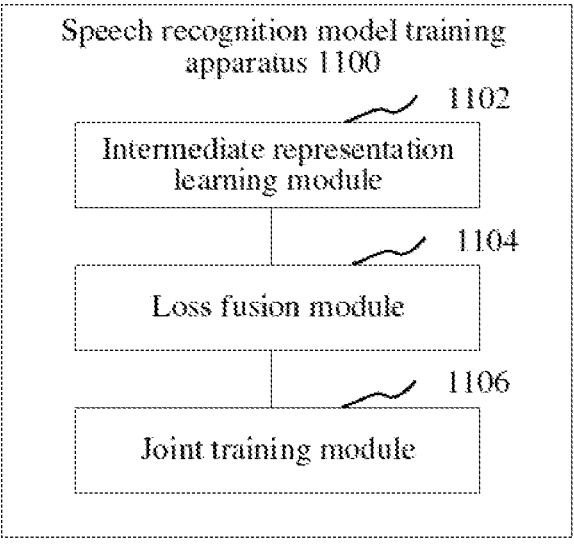
FIG. 11 is a structural block diagram of an example speech recognition apparatus according to an embodiment.

As shown in FIG. 11, in an example embodiment, a speech recognition apparatus 1100 is provided, including: an intermediate representation learning module 1102, a loss fusion module 1104, and a joint training module 1106.

The intermediate representation learning module 1102 is configured to obtain a first loss function of a speech separation and enhancement model and a second loss function of a speech recognition model; and perform back propagation based on the second loss function to train an intermediate model bridged between the speech separation and enhancement model and the speech recognition model, to obtain a robust representation model.

The loss fusion module 1104 is configured to fuse the first loss function and the second loss function, to obtain a target loss function.

The joint training module 1106 is configured to jointly train the speech separation and enhancement model, the robust representation model, and the speech recognition model based on the target loss function, and ending the training when a preset convergence condition is met.

Figure 12:
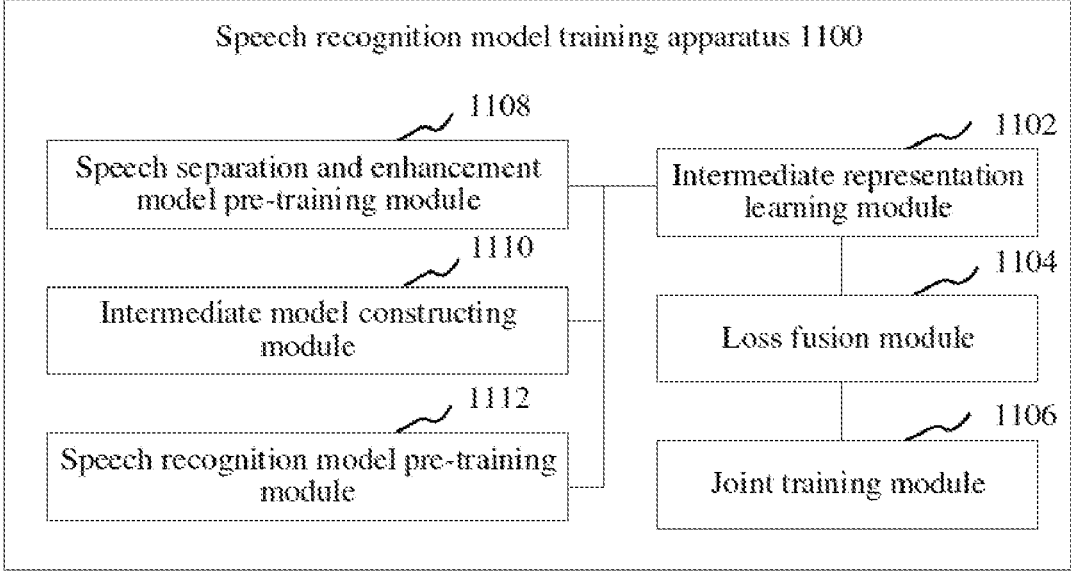
FIG. 12 is a structural block diagram of an example speech recognition apparatus according to another embodiment.

In an example embodiment, as shown in FIG. 12, the foregoing speech recognition apparatus 1100 further includes a speech separation and enhancement model pre-training module 1108, configured to extract an estimated spectrum and an embedding feature matrix of a sample speech stream based on a first neural network model; determine an attractor corresponding to the sample speech stream according to the embedding feature matrix and a preset ideal masking matrix; obtain a target masking matrix of the sample speech stream by calculating a similarity between each matrix element in the embedding feature matrix and the attractor; and determine an enhanced spectrum corresponding to the sample speech stream according to the target masking matrix; and train the first neural network model based on the MSE loss between the estimated spectrum and the enhanced spectrum corresponding to the sample speech stream, to obtain the speech separation and enhancement model.

In an example embodiment, the speech separation and enhancement model pre-training module 1108 is further configured to perform Fourier transform on the sample speech stream, to obtain a speech spectrum and a speech feature of each audio frame; perform speech separation and speech enhancement on the speech spectrum based on the first neural network model, to obtain the estimated spectrum; and map the speech feature to an embedding space based on the first neural network model, to obtain the embedding feature matrix.

In an example embodiment, the speech separation and enhancement model pre-training module 1108 is further configured to determine an ideal masking matrix according to the speech spectrum and the speech feature; filter out noise elements in the ideal masking matrix based on a preset binary threshold matrix; and determine the attractor corresponding to the sample speech stream according to the embedding feature matrix and the ideal masking matrix from which the noise elements have been filtered out.

In an example embodiment, as shown in FIG. 12, the foregoing speech recognition apparatus 1100 further includes an intermediate model constructing module 1110, configured to obtain a second neural network model; perform non-negative constraint processing on the second neural network model, to obtain a non-negative neural network model; obtain a differential model configured for performing auditory matching on an acoustic feature outputted by the non-negative neural network model; and cascade the differential model and the non-negative neural network model, to obtain the intermediate model.

In an example embodiment, the intermediate model constructing module 1110 is further configured to obtain a logarithmic model configured for performing a logarithmic operation on a feature vector corresponding to the acoustic feature; obtain a difference model configured for performing a difference operation on the feature vector corresponding to the acoustic feature; and construct the differential model according to the logarithmic model and the difference model.

In an example embodiment, as shown in FIG. 12, the foregoing speech recognition apparatus 1100 further includes a speech recognition model pre-training module 1112, configured to obtain a sample speech stream and corresponding phoneme categories that are annotated; extract a depth feature of each audio frame of the sample speech stream by using a third neural network model; determine a center vector of the sample speech stream according to depth features corresponding to audio frames of all the phoneme categories; determine a fusion loss between an inter-class confusion measurement index and an intra-class distance penalty index of each audio frame based on the depth features and the center vector; and train the third neural network model based on the fusion losses, to obtain the speech recognition model.

In an example embodiment, speech recognition model pre-training module 1112 is further configured to input the depth features into a cross entropy function and calculate the inter-class confusion measurement index of each audio frame; input the depth features and the center vector into a center loss function and calculate the intra-class distance penalty index of each audio frame; and perform a fusion operation on the inter-class confusion measurement index and the intra-class distance penalty index, to obtain the fusion loss.

In an example embodiment, the joint training module 1106 is further configured to determine a global descent gradient generated by the target loss function; and iteratively update model parameters respectively corresponding to the speech separation and enhancement model, the robust representation model, and the speech recognition model according to the global descent gradient, until a minimum loss value of the target loss function is obtained.

Figure 13:
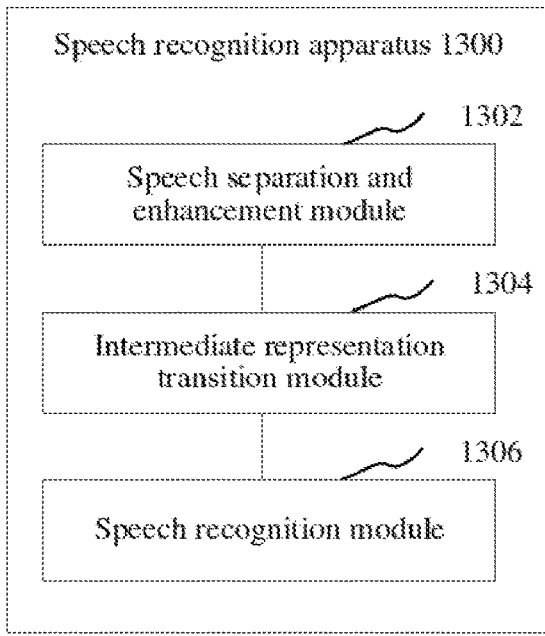
FIG. 13 is a structural block diagram of a speech recognition apparatus according to an embodiment.

As shown in FIG. 13, in an example embodiment, a speech recognition apparatus 1300 is provided, including a speech separation and enhancement module 1302, an intermediate representation transition module 1304, and a speech recognition module 1306. The speech separation and enhancement module 1302 is configured to obtain a target speech stream; and extract an enhanced spectrum of each audio frame of the target speech stream based on a speech separation and enhancement model. The intermediate representation transition module 1304 is configured to perform auditory matching on the enhanced spectrum based on a robust representation model to obtain a robust feature. The speech recognition module 1306 is configured to recognize the robust feature based on the speech recognition model, to obtain a phoneme corresponding to each audio frame; where the speech separation and enhancement model, the robust representation model, and the speech recognition model are obtained by joint training.

In an example embodiment, the speech separation and enhancement model includes a first neural network model. The speech separation and enhancement module 1302 is further configured to extract an embedding feature matrix of each audio frame of the target speech stream based on the first neural network model; determine an attractor corresponding to the target speech stream according to the embedding feature matrix and a preset ideal masking matrix; obtain a target masking matrix of the target speech stream by calculating a similarity between each matrix element in the embedding feature matrix and the attractor; and determine the enhanced spectrum corresponding to the each audio frame of the target speech stream according to the target masking matrix.

In an example embodiment, the robust representation model includes a second neural network model and a differential model. The speech recognition module 1306 is further configured to extract an acoustic feature from the enhanced spectrum based on the second neural network model; perform non-negative constraint processing on the acoustic feature, to obtain a non-negative acoustic feature; and perform a differential operation on the non-negative acoustic feature based on the differential model, to obtain the robust feature matching auditory habits of human ears.

Figure 14:
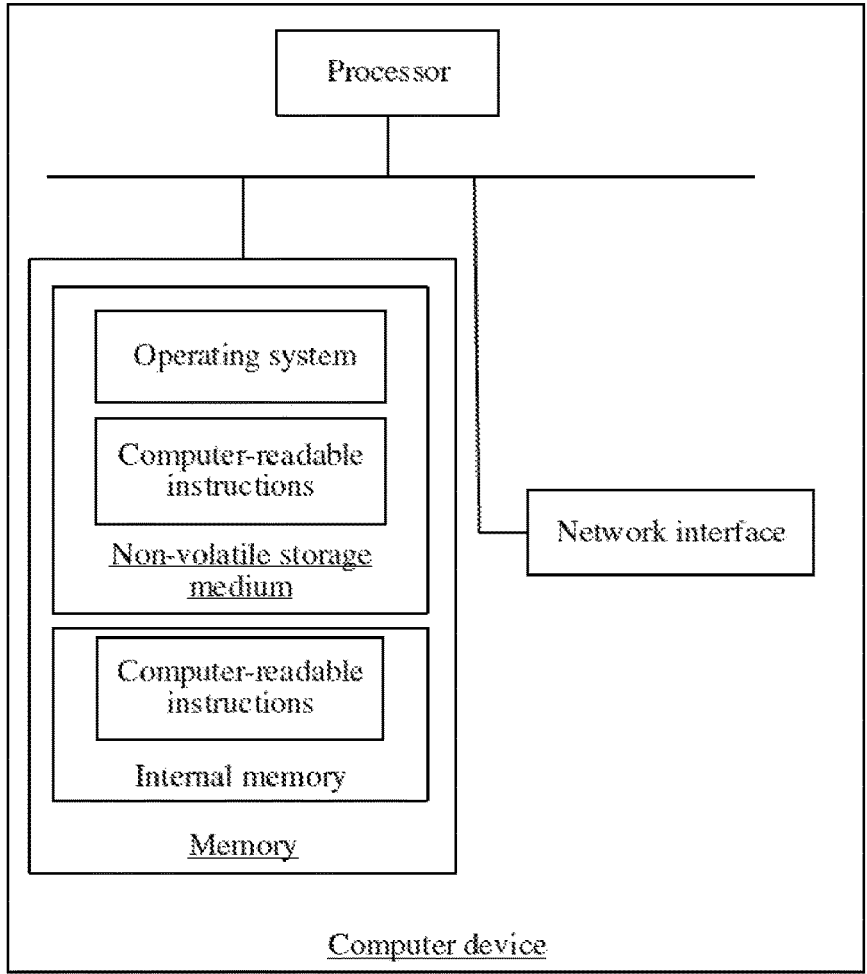
FIG. 14 is a structural block diagram of an example computer device according to an embodiment.

FIG. 14 is a diagram of an internal structure of a computer device according to an embodiment. The computer device may be specifically the terminal 110 or the server 120 in FIG. 1. As shown in FIG. 14, the computer device includes a processor, a memory, and a network interface connected by using a system bus. The memory includes a non-volatile storage medium and an internal memory. The non-volatile storage medium of the computer device stores an operating system, and may further store computer-readable instructions. The computer-readable instructions, when executed by the processor, may cause the processor to implement the speech recognition method. The internal memory may also store a computer-readable instruction, and when the computer-readable instruction is executed by the processor, the processor may be caused to perform the speech recognition method. A person skilled in the art may understand that the structure shown in FIG. 14 is a block diagram of a partial structure related to the solution of this application, and does not constitute a limitation to the computer device to which the solution of this application is applied. Specifically, the computer device may include more or fewer components than those shown in the figure, or some components may be combined, or a different component deployment may be used.

In an example embodiment, the speech recognition apparatus provided in this application may be implemented in a form of a computer-readable instruction, and the computer-readable instruction may run on the computer device shown in FIG. 14. The memory of the computer device may store program modules forming the speech recognition apparatus, for example, the speech separation and enhancement module, the intermediate representation transition module, and the speech recognition module shown in FIG. 13. The computer-readable instructions formed by the program modules cause the processor to perform the steps in the speech recognition method in the embodiments of this application described in this specification.

In an example embodiment, a computer device is provided, including: a memory and a processor. The memory stores computer-readable instructions, the computer-readable instructions, when executed by the processor, causing the processor to perform the steps in the foregoing speech recognition method. The steps of the speech recognition method may be the steps of the speech recognition method in the foregoing embodiments.

In an example embodiment, a computer-readable storage medium is provided. The computer-readable storage medium stores computer-readable instructions, the computer-readable instructions, when executed by the processor, causing the processor to perform the steps in the foregoing speech recognition method. The steps of the speech recognition method may be the steps of the speech recognition method in the foregoing embodiments.

In an example embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of the procedures of the methods in the foregoing embodiments may be implemented by a computer-readable instruction instructing relevant hardware. The program may be stored in a non-volatile computer-readable storage medium. When the program runs, the procedures of the foregoing method embodiments are performed. Any reference to a memory, a storage, a database, or another medium used in the embodiments provided in this application can include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a RAM or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification. The foregoing embodiments only show several implementations of this application and are described in detail, but are not to be construed as a limitation to the patent scope of this application. For a person of ordinary skill in the art, several transformations and improvements can be made without departing from the idea of this application, and such transformations and improvements all fall within the protection scope of this application. Therefore, the protection scope of this application shall be subject to the protection scope of the appended claims.

What is claimed is:

1. A speech recognition method, performed by a computer device, the method comprising:
obtaining a first loss function of a speech separation and enhancement model and a second loss function of a speech recognition model;
performing back propagation based on the second loss function to train an intermediate model bridging between the speech separation and enhancement model and the speech recognition model, to obtain a representation model;
fusing the first loss function and the second loss function using a machine learning algorithm, to obtain a target loss function; and
jointly training the speech separation and enhancement model, the representation model, and the speech recognition model based on the target loss function, and ending the joint training when a preset convergence condition is met.

2. The method according to claim 1, further comprising:
extracting an estimated spectrum and an embedding feature matrix of a sample speech stream based on a first neural network model;
determining an attractor corresponding to the sample speech stream according to the embedding feature matrix and a preset ideal masking matrix;
obtaining a target masking matrix of the sample speech stream by calculating a similarity between each matrix element in the embedding feature matrix and the attractor;
determining an enhanced spectrum corresponding to the sample speech stream according to the target masking matrix; and
training the first neural network model based on a mean-square error (MSE) loss between the estimated spectrum and the enhanced spectrum corresponding to the sample speech stream, to obtain the speech separation and enhancement model.

3. The method according to claim 2, wherein extracting the estimated spectrum and the embedding feature matrix of the sample speech stream based on the first neural network model comprises:
performing Fourier transform on the sample speech stream, to obtain a speech spectrum and a speech feature of each audio frame of the sample speech stream;
performing speech separation (SS) and speech enhancement (SE) on the speech spectrum based on the first neural network model, to obtain the estimated spectrum; and
mapping the speech feature to an embedding space based on the first neural network model, to obtain the embedding feature matrix.

4. The method according to claim 3, wherein determining the attractor corresponding to the sample speech stream according to the embedding feature matrix and the preset ideal masking matrix comprises:
determining an ideal masking matrix according to the speech spectrum and the speech feature;
filtering out noise elements in the ideal masking matrix based on a preset binary threshold matrix to obtain the preset ideal masking matrix; and
determining the attractor corresponding to the sample speech stream according to the embedding feature matrix and the preset ideal masking matrix.

5. The method according to claim 1, further comprising:
obtaining a second neural network model;
performing non-negative constraint processing on the second neural network model, to obtain a non-negative neural network model;
obtaining a differential model configured for performing auditory matching on an acoustic feature outputted by the non-negative neural network model; and
cascading the differential model and the non-negative neural network model, to obtain the intermediate model.

6. The method according to claim 5, wherein obtaining the differential model configured for performing auditory matching on the acoustic feature outputted by the non-negative neural network model comprises:
obtaining a logarithmic model configured for performing a logarithmic operation on a feature vector corresponding to the acoustic feature;

33 obtaining a difference model configured for performing a difference operation on the feature vector corresponding to the acoustic feature; and constructing the differential model according to the logarithmic model and the difference model.

7. The method according to claim 1, further comprising:

obtaining a sample speech stream and corresponding phoneme categories that are annotated;

extracting a depth feature of each audio frame of the sample speech stream by using a third neural network model;

determining a center vector of the sample speech stream according to depth features corresponding to audio frames of all the phoneme categories;

determining a fusion loss between an inter-class confusion measurement index and an intra-class distance penalty index of each audio frame based on the depth features and the center vector; and training the third neural network model based on the fusion losses, to obtain the speech recognition model.

8. The method according to claim 7, wherein determining a fusion loss between the inter-class confusion measurement index and the intra-class distance penalty index of each audio frame based on the depth features and the center vector comprises:

inputting the depth features into a cross entropy function and calculating the inter-class confusion measurement index of each audio frame of the sample speech stream;

inputting the depth features and the center vector into a center loss function and calculating the intra-class distance penalty index of each audio frame; and performing a fusion operation on the inter-class confusion measurement index and the intra-class distance penalty index, to obtain the fusion loss.

9. The method according to claim 1, wherein jointly training the speech separation and enhancement model, the representation model, and the speech recognition model based on the target loss function comprises:

determining a global descent gradient generated by the target loss function; and iteratively updating model parameters corresponding to the speech separation and enhancement model, the representation model, and the speech recognition model according to the global descent gradient, until a minimum loss value of the target loss function is obtained.

10. A speech recognition method, performed by a computer device, the method comprising:

obtaining a target speech stream;

extracting an enhanced spectrum of each audio frame of the target speech stream based on a speech separation and enhancement model;

performing auditory matching on the enhanced spectrum based on a representation model to obtain a representation feature, wherein the representation model is obtained by performing back propagation based on a first loss function of a speech recognition model to train an intermediate model bridging between the speech separation and enhancement model and the speech recognition model; and recognizing the representation feature based on the speech recognition model, to obtain a phoneme corresponding to each audio frame, wherein the speech separation and enhancement model, the representation model, and the speech recognition model comprises neural networks with network parameters obtained by joint training by iteratively minimizing a fused loss function of the first loss function and a second loss function of the speech separation and enhancement model.

11. The method according to claim 10, wherein the speech separation and enhancement model comprises a first neural network model; and extracting the enhanced spectrum of each audio frame of the target speech stream based on the speech separation and enhancement model comprises:

extracting an embedding feature matrix of each audio frame of the target speech stream based on the first neural network model;

determining an attractor corresponding to the target speech stream according to the embedding feature matrix and a preset ideal masking matrix;

obtaining a target masking matrix of the target speech stream by calculating a similarity between each matrix element in the embedding feature matrix and the attractor; and determining the enhanced spectrum corresponding to each audio frame of the target speech stream according to the target masking matrix.

12. The method according to claim 10, wherein the representation model comprises a second neural network model and a differential model; and performing the auditory matching on the enhanced spectrum based on the representation model to obtain the representation feature comprises:

extracting an acoustic feature from the enhanced spectrum based on the second neural network model;

performing non-negative constraint processing on the acoustic feature, to obtain a non-negative acoustic feature; and performing a differential operation on the non-negative acoustic feature based on the differential model, to obtain the representation feature matching auditory habits of human ears.

13. A speech recognition device, comprising a memory for storing computer instructions and a processor for executing the computer instructions to:

obtain a first loss function of a speech separation and enhancement model and a second loss function of a speech recognition model;

perform back propagation based on the second loss function to train an intermediate model bridging between the speech separation and enhancement model and the speech recognition model, to obtain a representation model;

fuse the first loss function and the second loss function using a machine learning algorithm, to obtain a target loss function; and jointly train the speech separation and enhancement model, the representation model, and the speech recognition model based on the target loss function, and ending the joint training when a preset convergence condition is met.

14. The speech recognition device of claim 13, wherein the processor is further configured to execute the computer instructions to:

extract an estimated spectrum and an embedding feature matrix of a sample speech stream based on a first neural network model;

determine an attractor corresponding to the sample speech stream according to the embedding feature matrix and a preset ideal masking matrix;

obtain a target masking matrix of the sample speech stream by calculating a similarity between each matrix element in the embedding feature matrix and the attractor;

determine an enhanced spectrum corresponding to the sample speech stream according to the target masking matrix; and train the first neural network model based on a mean-square error (MSE) loss between the estimated spectrum and the enhanced spectrum corresponding to the sample speech stream, to obtain the speech separation and enhancement model.

15. The speech recognition device of claim 14, wherein to extract the estimated spectrum and the embedding feature matrix of the sample speech stream based on the first neural network model, the processor is configured to execute the computer instruction to:

perform Fourier transform on the sample speech stream, to obtain a speech spectrum and a speech feature of each audio frame of the sample speech stream;

perform speech separation (SS) and speech enhancement (SE) on the speech spectrum based on the first neural network model, to obtain the estimated spectrum; and map the speech feature to an embedding space based on the first neural network model, to obtain the embedding feature matrix.

16. The speech recognition device of claim 13, wherein the processor is further configured to execute the computer instructions to:

obtain a second neural network model;

perform non-negative constraint processing on the second neural network model, to obtain a non-negative neural network model;

obtain a differential model configured for performing auditory matching on an acoustic feature outputted by the non-negative neural network model; and cascade the differential model and the non-negative neural network model, to obtain the intermediate model.

17. The speech recognition device of claim 13, wherein the processor is further configured to execute the computer instructions to:

obtain a sample speech stream and corresponding phoneme categories that are annotated;

extract a depth feature of each audio frame of the sample speech stream by using a third neural network model;

determine a center vector of the sample speech stream according to depth features corresponding to audio frames of all the phoneme categories;

determine a fusion loss between an inter-class confusion measurement index and an intra-class distance penalty index of each audio frame based on the depth features and the center vector; and train the third neural network model based on the fusion losses, to obtain the speech recognition model.

18. A computer device, comprising a memory and a processor, the memory storing computer-readable instructions, the computer-readable instructions, when executed by the processor, causing the processor to perform the method according to claim 10.

19. A computer-readable storage medium, storing computer-readable instructions, the computer-readable instructions, when executed by a processor, causing the processor to perform the method according to claim 1.

20. A computer-readable storage medium, storing computer-readable instructions, the computer-readable instructions, when executed by a processor, causing the processor to perform the method according to claim 10.

\* \* \* \* \*